United States Patent [19]
Yamamoto et al.

[11] Patent Number: 5,619,318
[45] Date of Patent: Apr. 8, 1997

[54] OPTICAL DISPLACEMENT SENSOR

[75] Inventors: Eiji Yamamoto, Tokyo; Takashi Mihara, Iruma; Masataka Ito, Tokyo, all of Japan

[73] Assignee: Olympus Optical Co., Ltd., Tokyo, Japan

[21] Appl. No.: 480,514

[22] Filed: Jun. 13, 1995

Related U.S. Application Data

[63] Continuation-in-part of Ser. No. 287,169, Aug. 8, 1994, abandoned.

[30] Foreign Application Priority Data

Aug. 10, 1993 [JP] Japan .................................. 5-198318

[51] Int. Cl.⁶ .......................................................... G01D 5/26
[52] U.S. Cl. ................................................................ 356/32
[58] Field of Search ........................... 356/32, 349, 373; 73/800; 372/92, 99; 379/92, 99

[56] References Cited

U.S. PATENT DOCUMENTS

| | | | |
|---|---|---|---|
| 4,452,533 | 6/1984 | Miles et al. | 356/352 |
| 4,475,812 | 10/1984 | Buczek et al. | 356/32 |
| 4,655,597 | 4/1987 | Yamamoto et al. | 356/373 |
| 4,983,035 | 1/1991 | Wright et al. | 372/92 |
| 5,103,572 | 4/1992 | Ricklefs | 356/358 |
| 5,331,658 | 7/1994 | Shieh et al. | 572/99 |

FOREIGN PATENT DOCUMENTS 60-256079 12/1985 Japan .

OTHER PUBLICATIONS

"Laser Diode Displacement Sensor with a Ball Lens for Use in Scanning Probe Miscroscopes," Shigeji Hara et al. Proceeding of 1992 Annual Meeting, Book G00743–1992, American Society of Mechanical Engineers, New York, pp. 33–39.

"Optical Tactile Sensor Using Surface–Emitting Laser", Eiji Yamamoto, et al, Olympus Optical Co., Ltd. pp. 227–231, 0–7803–2503–6, 1995 IEEE.

*Primary Examiner*—Richard A. Rosenberger
*Attorney, Agent, or Firm*—Frishauf, Holtz, Goodman, Langer & Chick

[57] ABSTRACT

The present invention comprises a compound cavity in which a vertical-cavity surface-emitting laser and external mirror are combined, and the change in intensity of a laser beam or in mirror loss is detected by the detection unit. The detection unit includes a photodetector for directly detecting a variation in intensity of a laser beam, and PN junction potential difference detecting device for detecting a variation in mirror loss created due to a relative displacement between the external mirror and the vertical-cavity surface-emitting laser, based on a change in carrier density within the surface-emitting laser. The phase of the laser beam returning from the external mirror is determined by a relative displacement between the external mirror and the vertical-cavity surface-emitting laser, and the laser beam output varies at a period of a displacement amount corresponding to ½ of the wavelength of the laser beam. Such a displacement amount is calculated by the counting device and the operation device.

17 Claims, 19 Drawing Sheets

(STRUCTURE OF COMPOSITE RESONATOR)

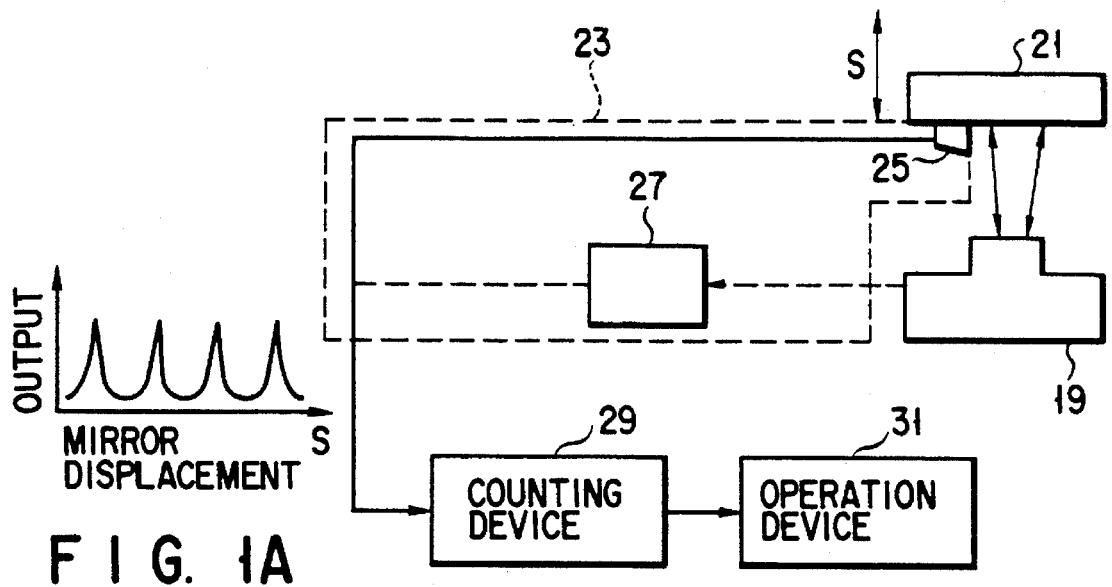
FIG. 1A
FIG. 1B
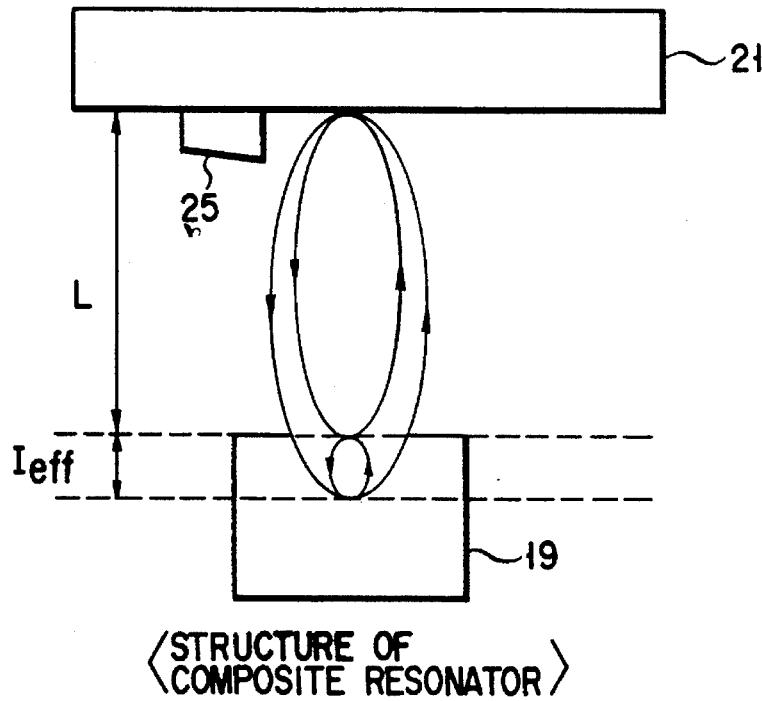
⟨STRUCTURE OF COMPOSITE RESONATOR⟩
FIG. 2

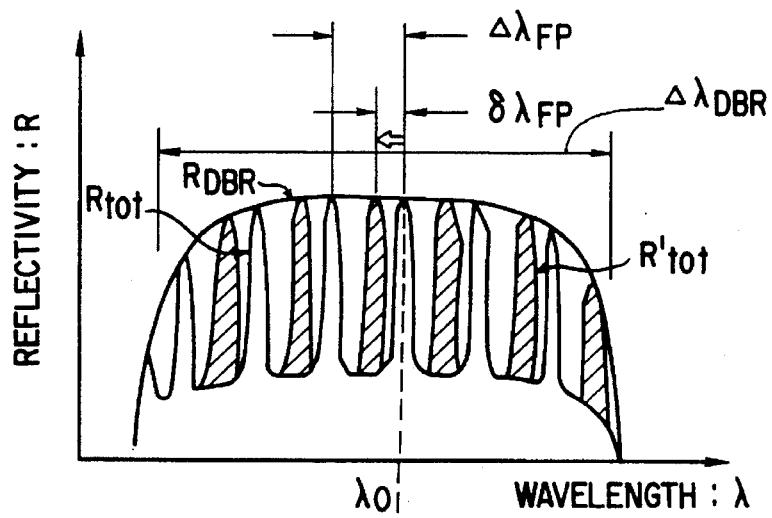
F I G. 3A
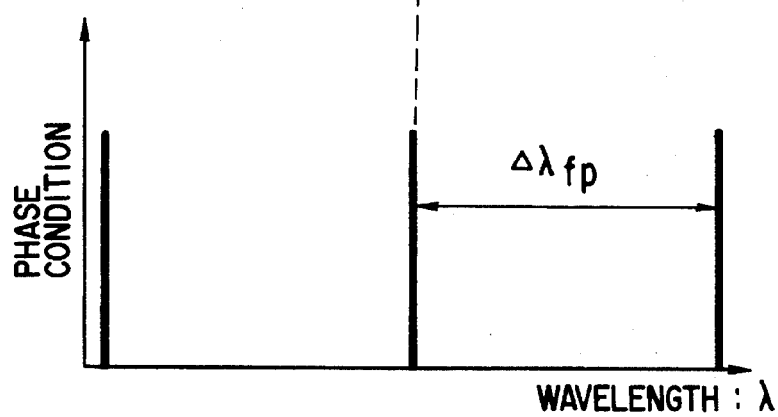
F I G. 3B
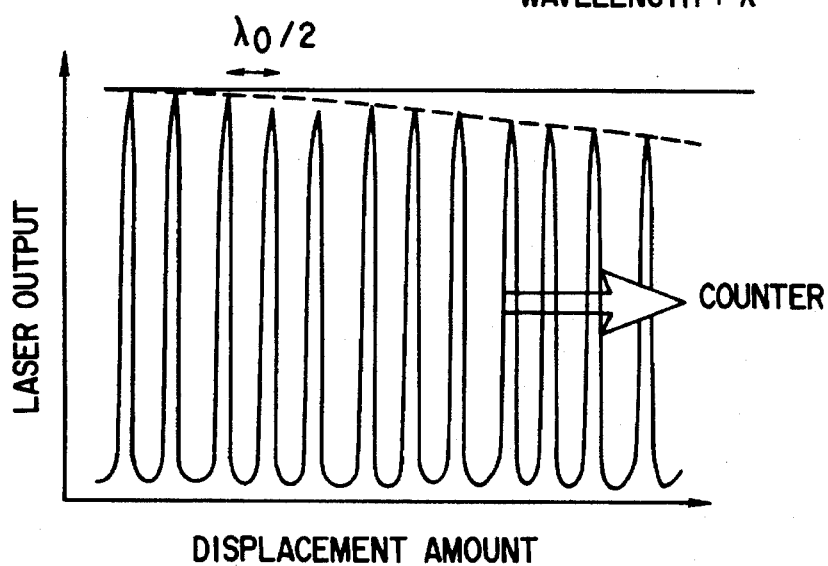
F I G. 3C

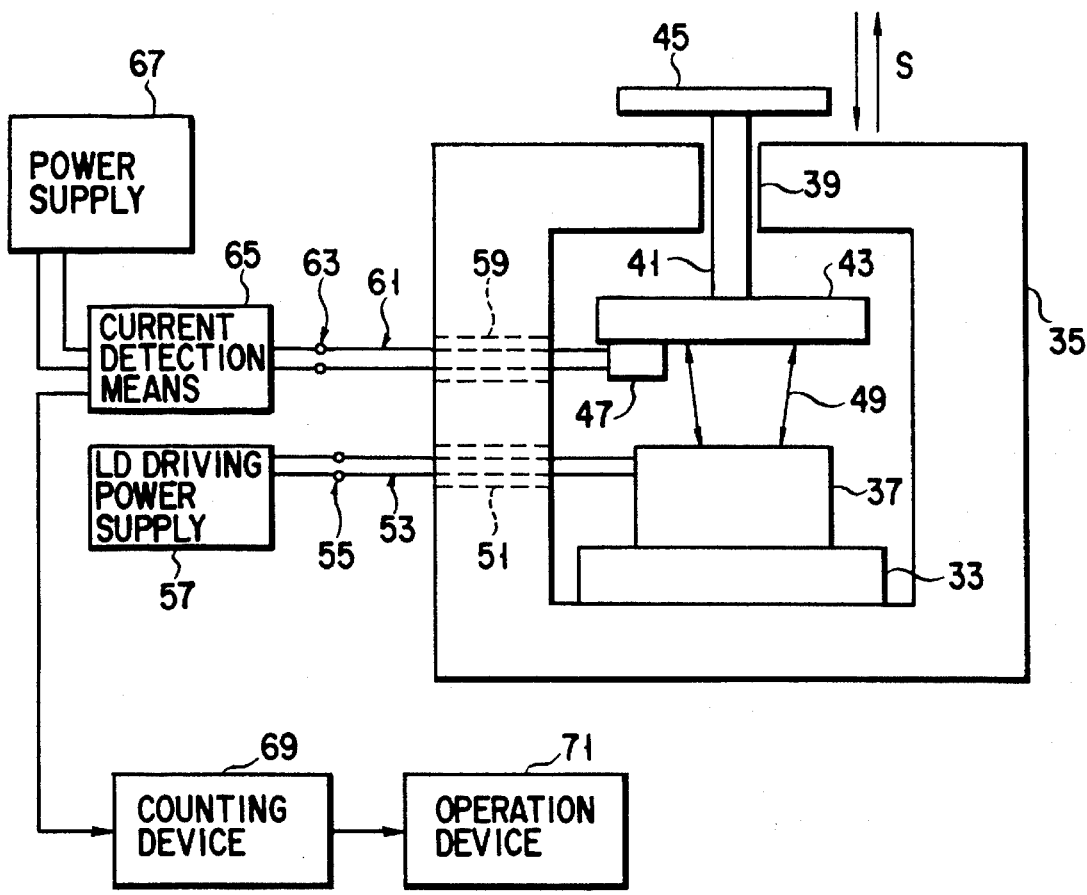
F I G. 4A
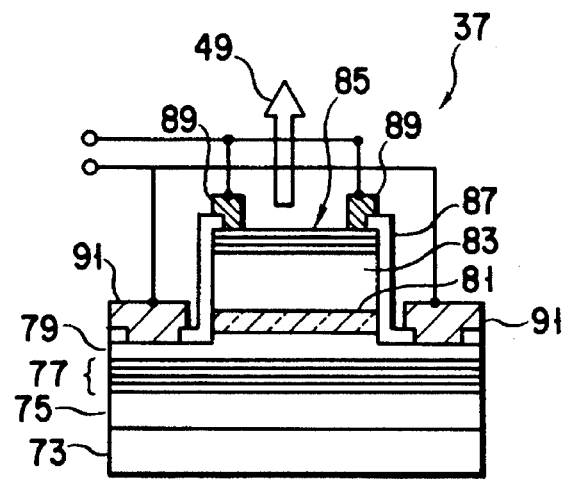
F I G. 4B

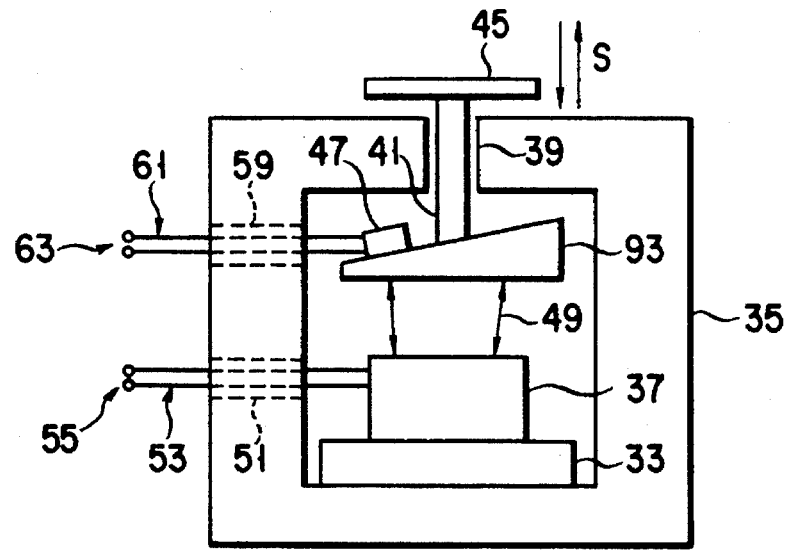
F I G. 5A
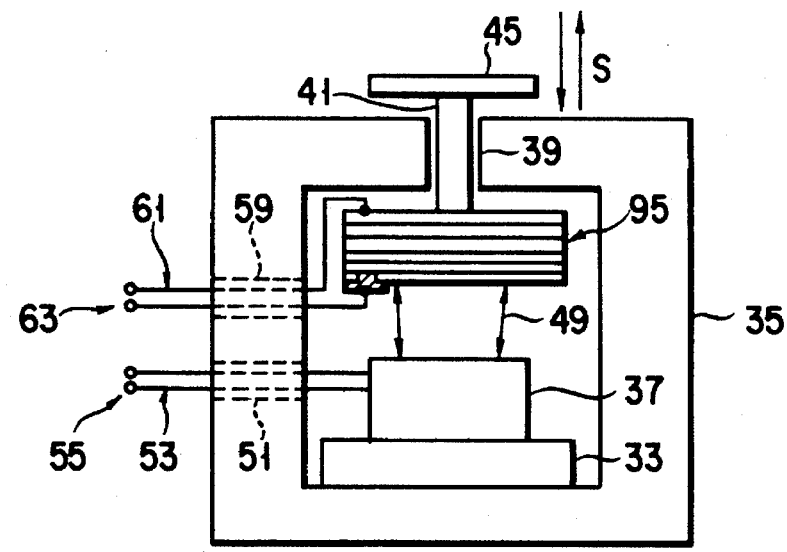
F I G. 5B
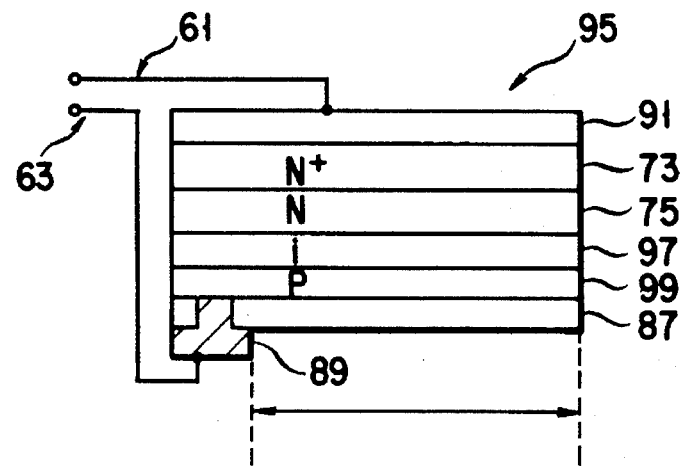
F I G. 5C

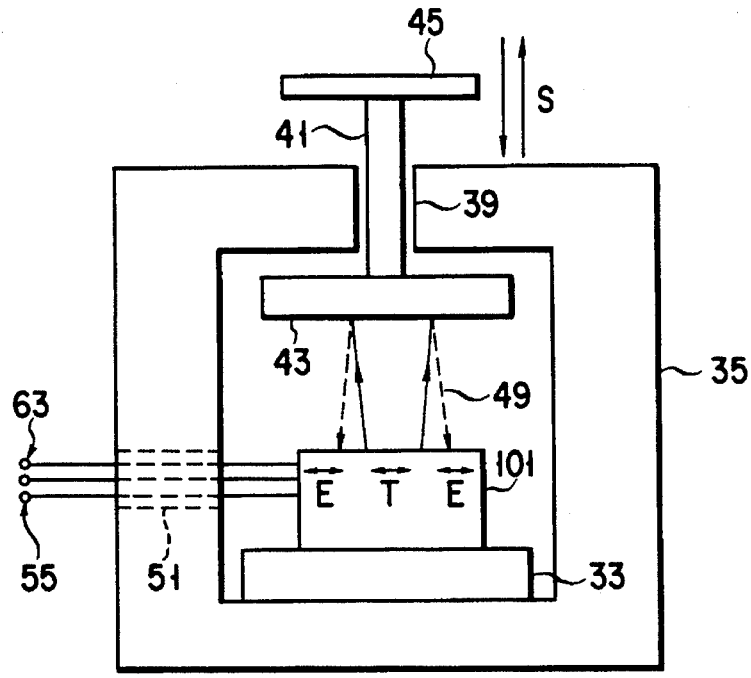
F I G. 6A
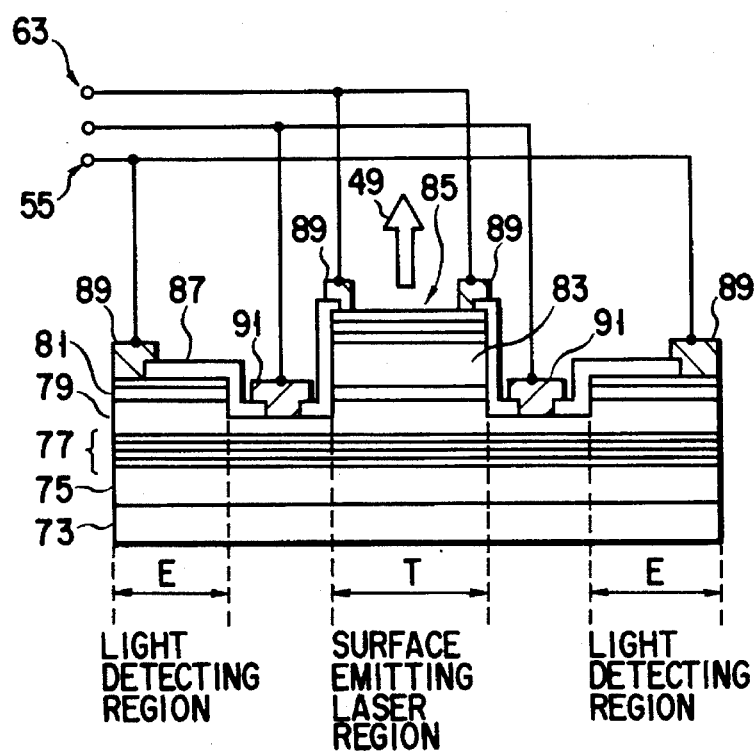
F I G. 6B

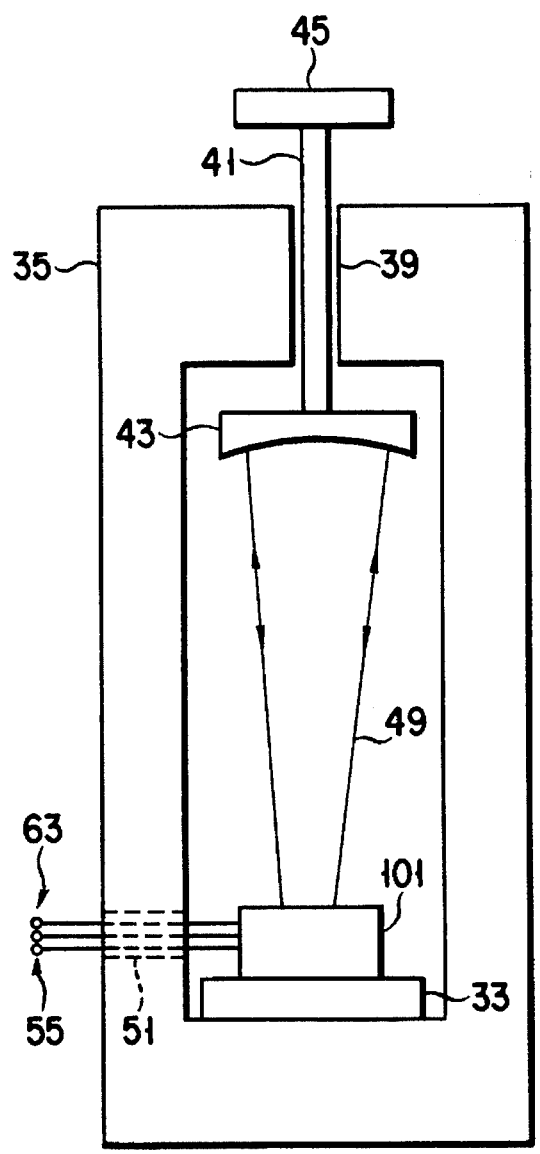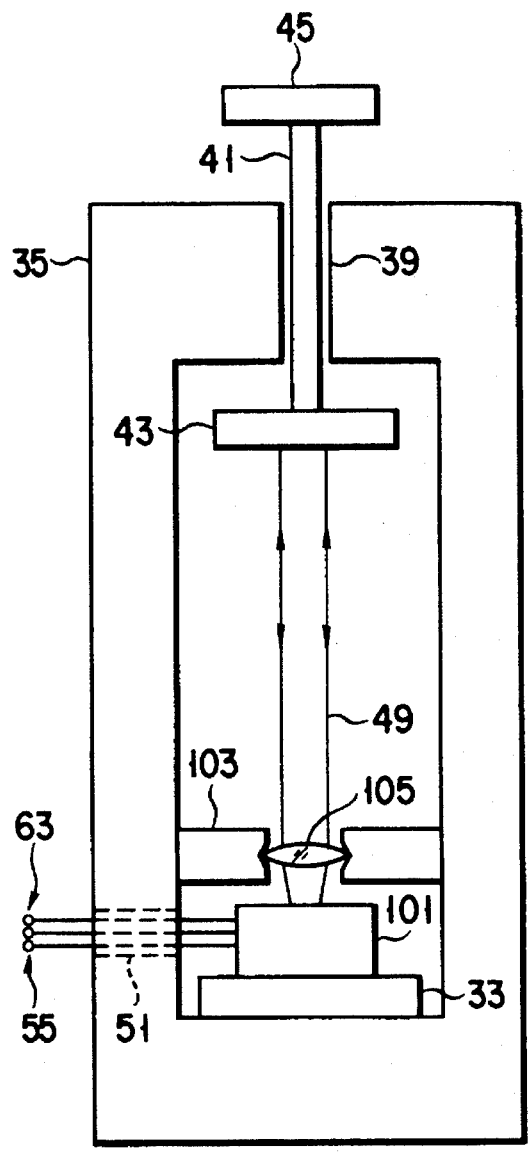
F I G. 7A    F I G. 7B

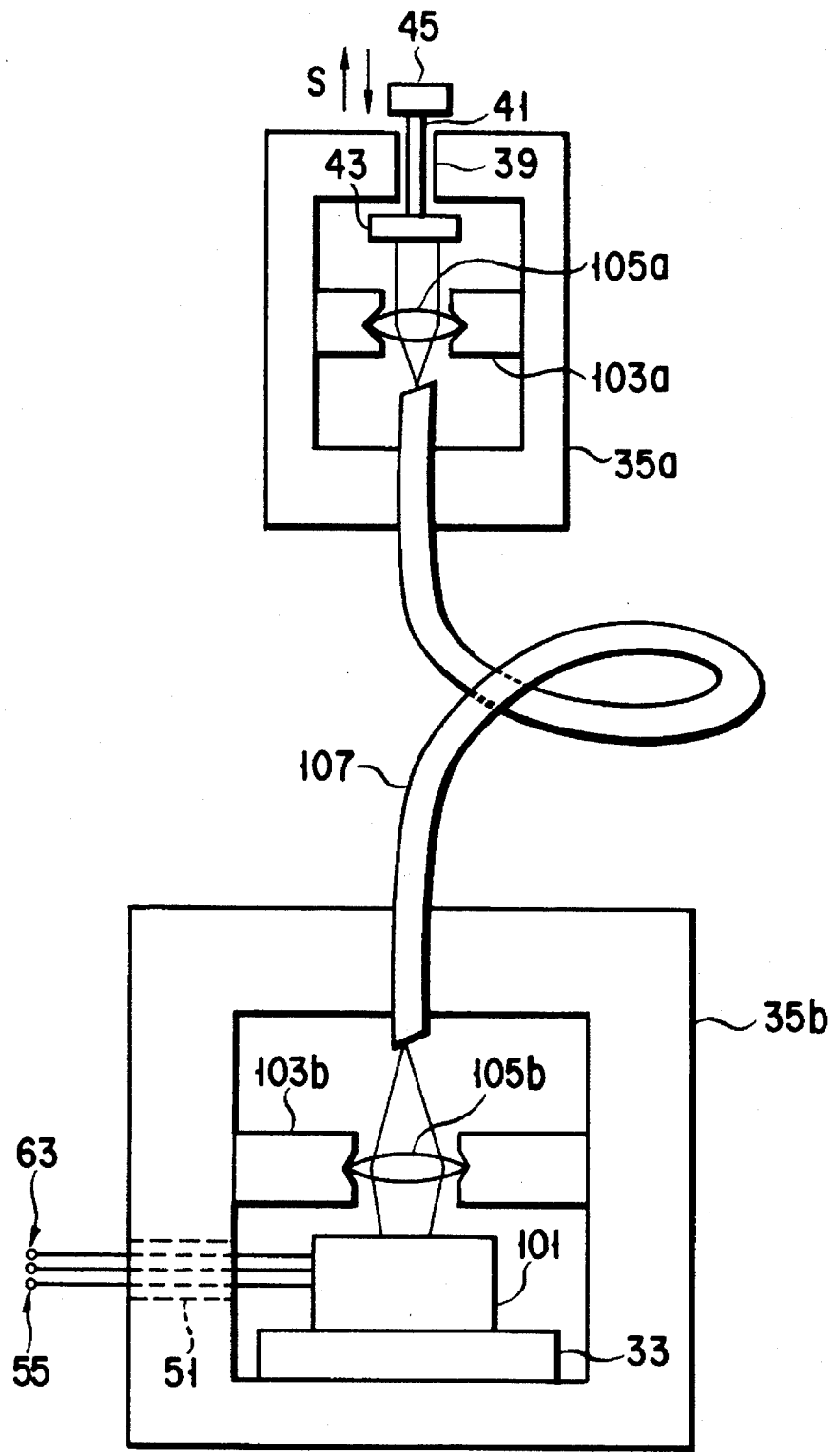
F I G. 8

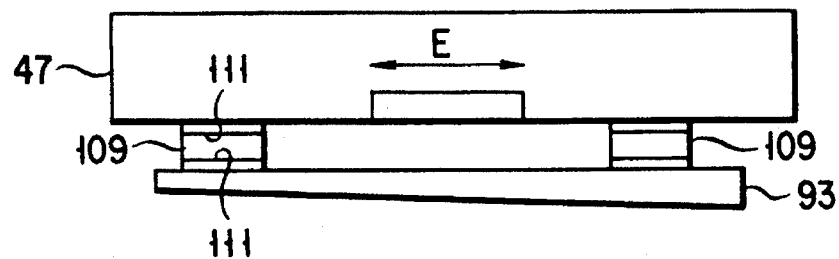
F I G. 9A
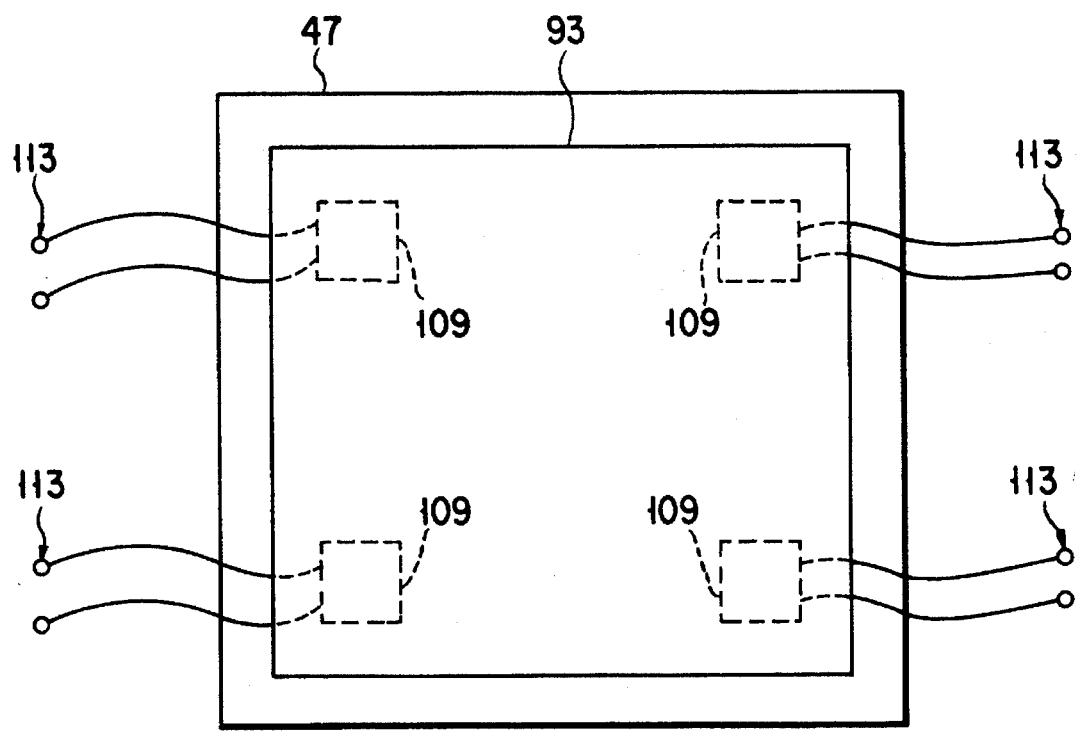
F I G. 9B

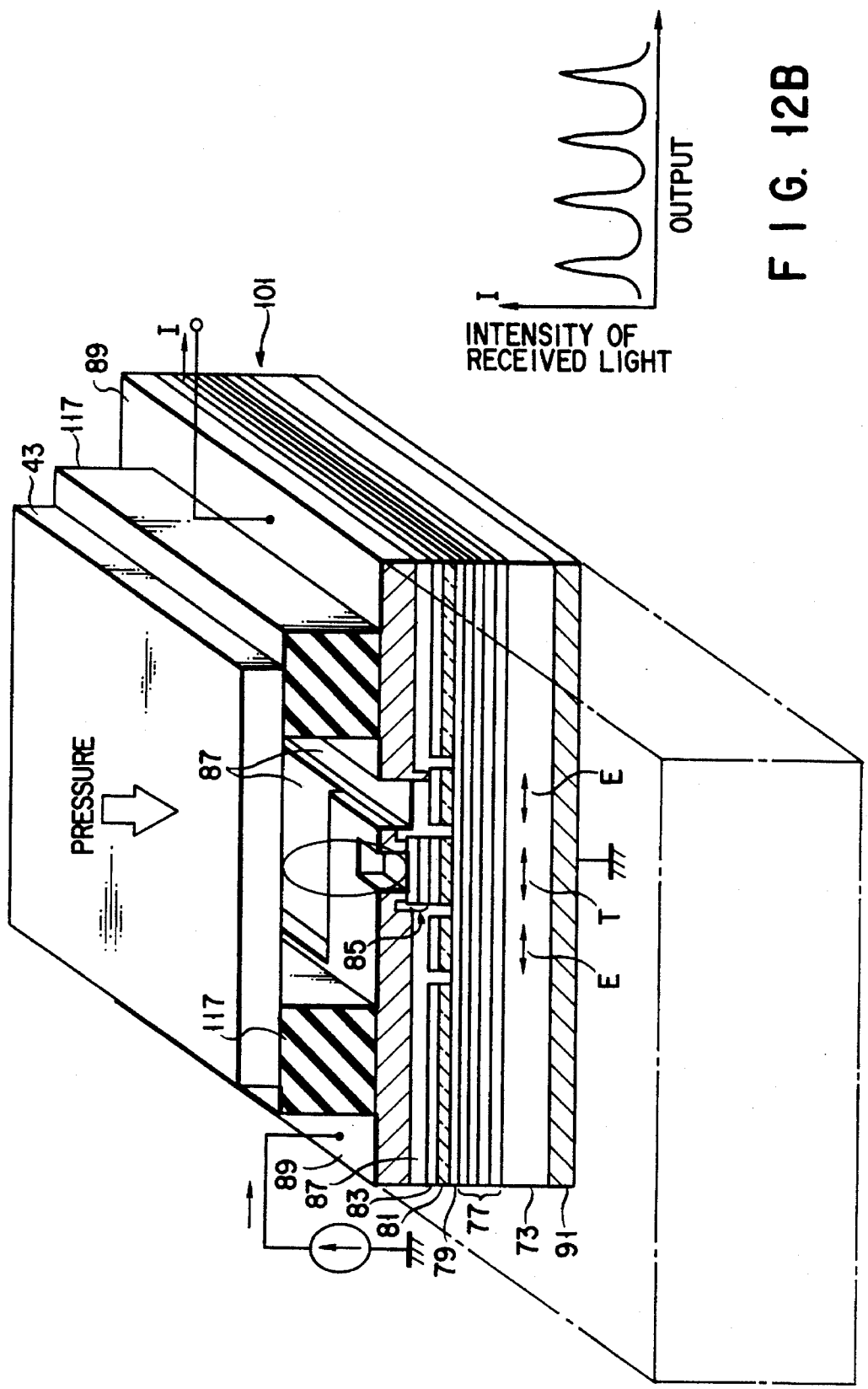

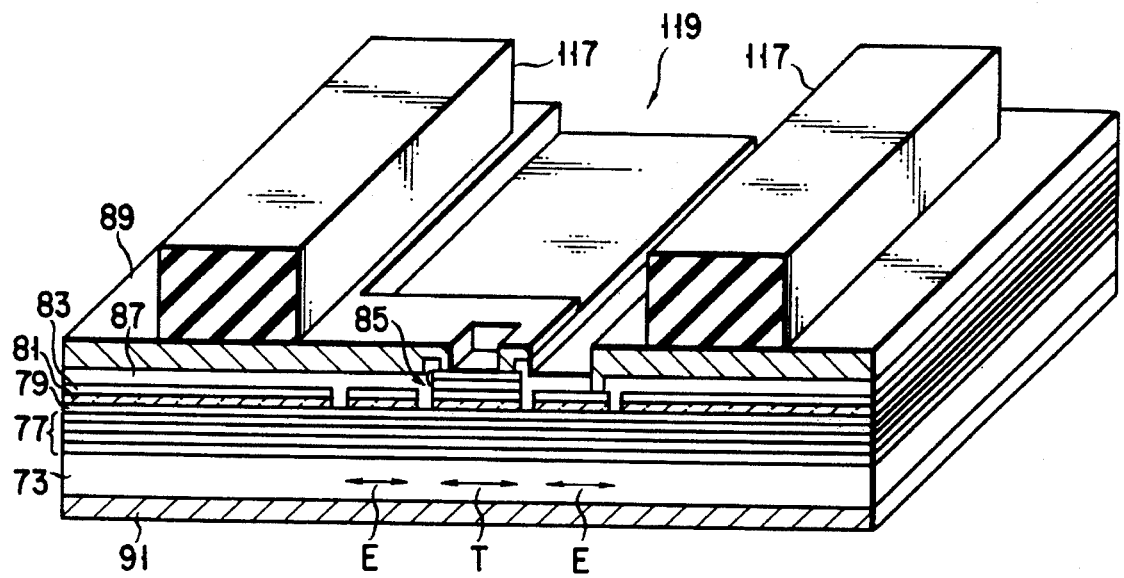
F I G. 15
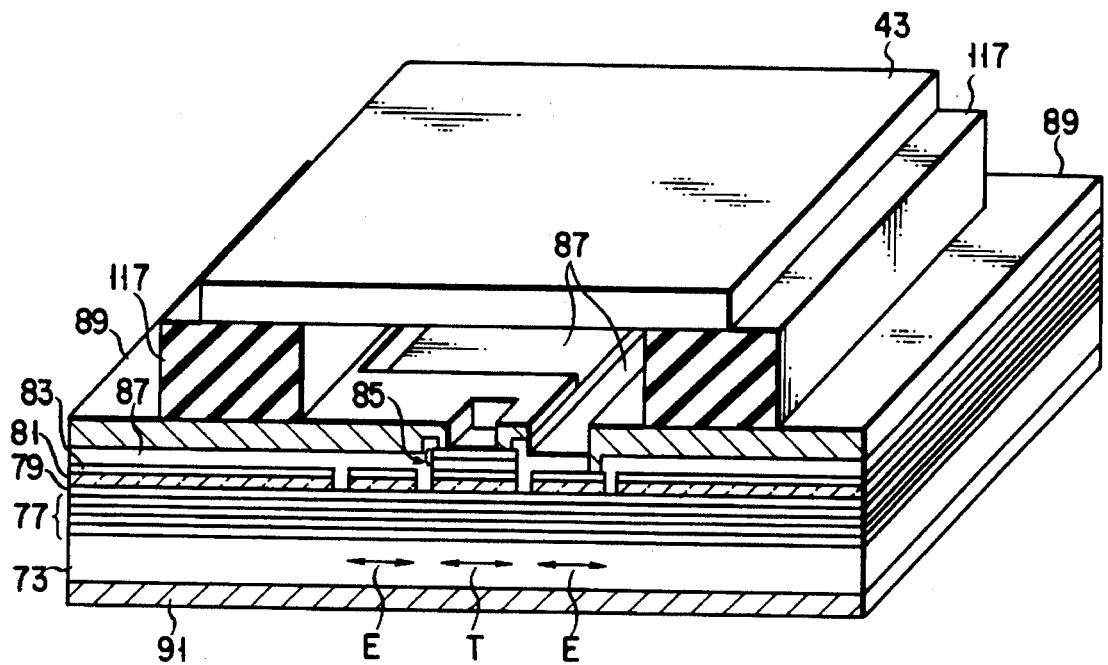
F I G. 16

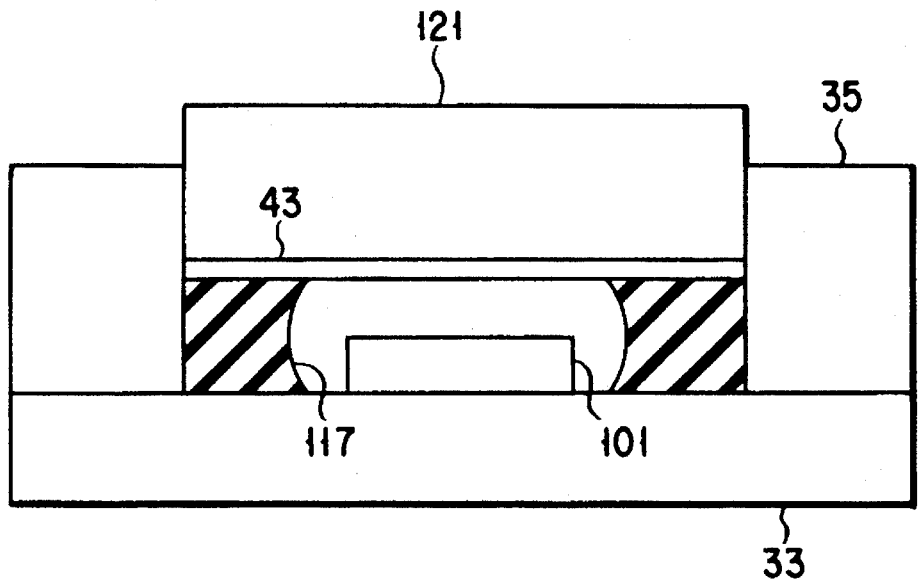
F I G. 17A
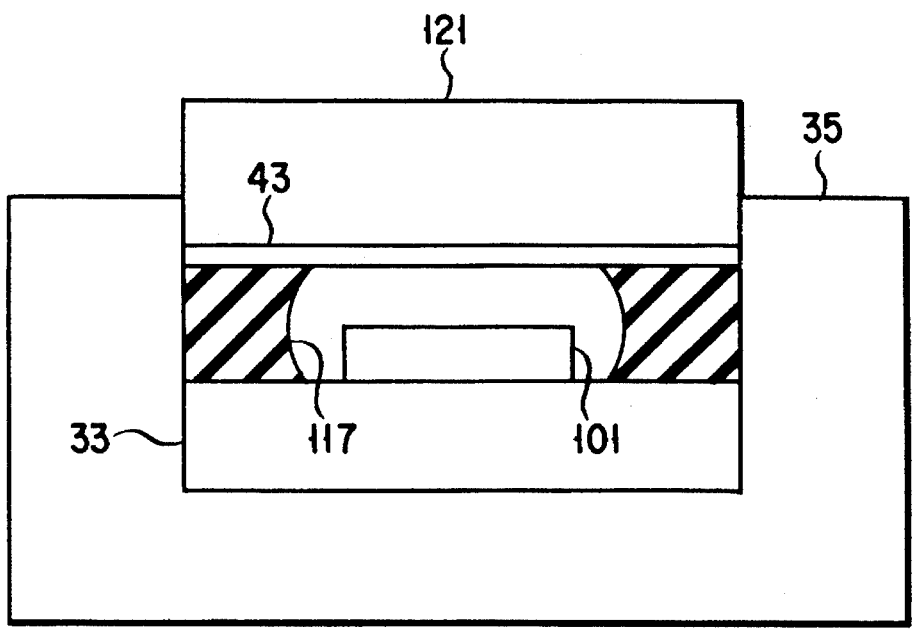
F I G. 17B

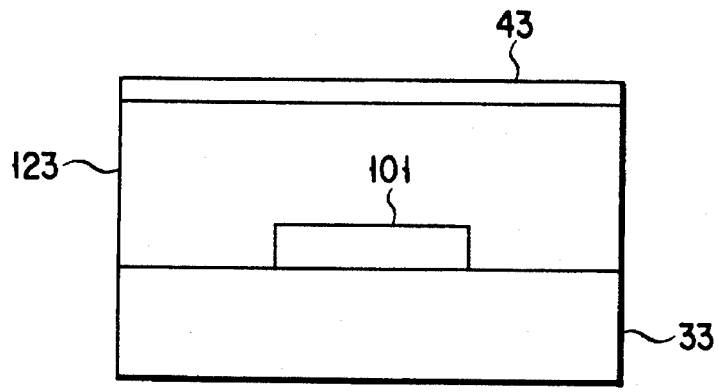
F I G. 18A
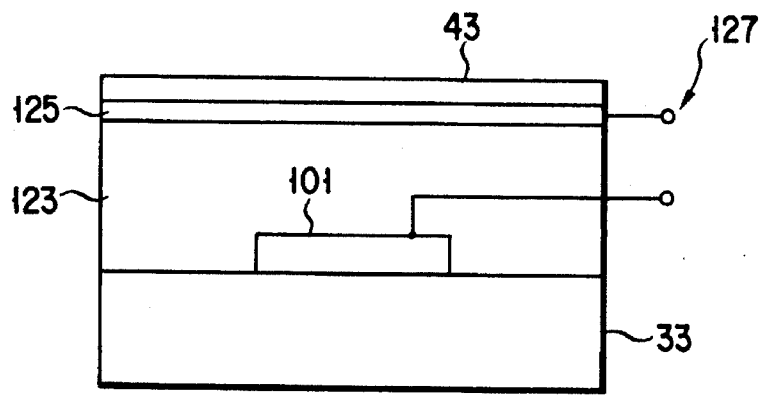
F I G. 18B
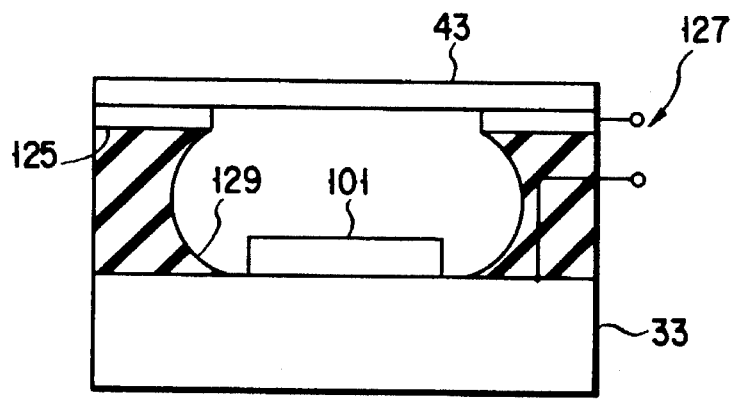
F I G. 19

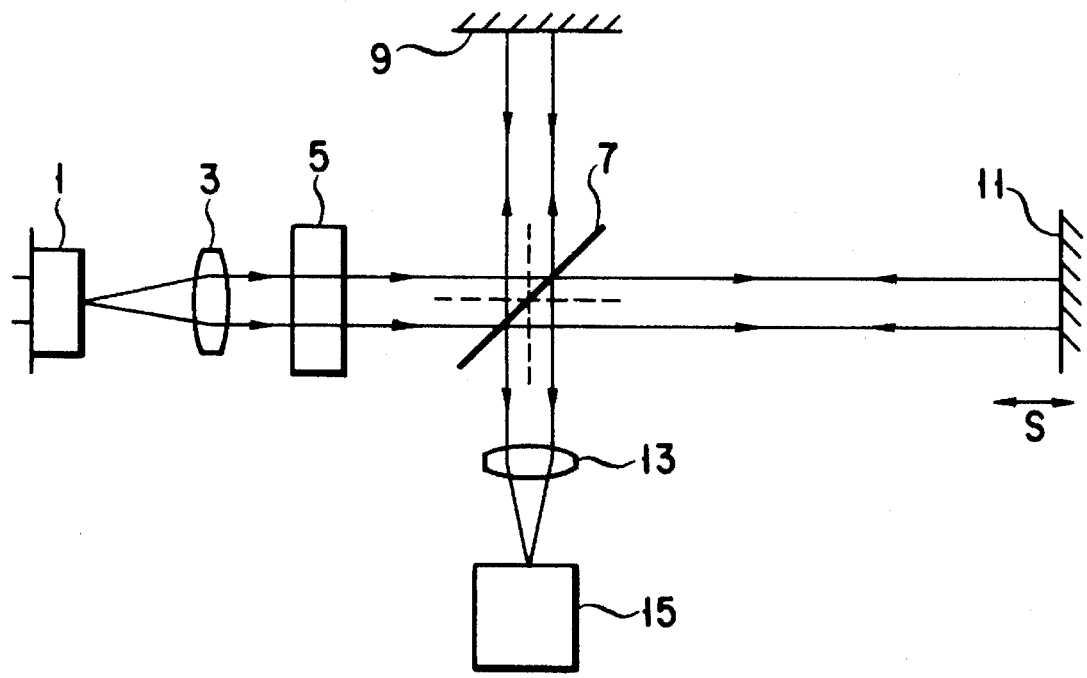
BASIC STRUCTURE OF MICHELSON INTERFEROMETER
F I G. 20
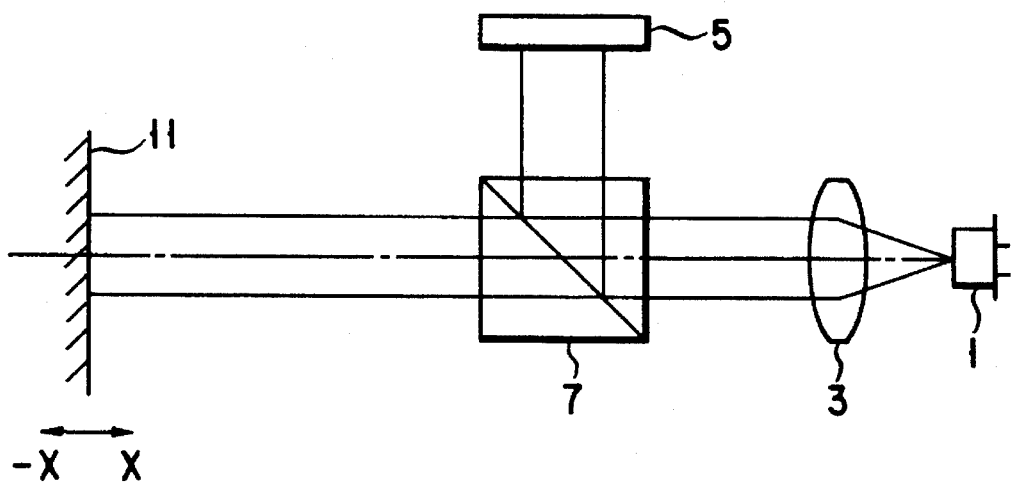
F I G. 21

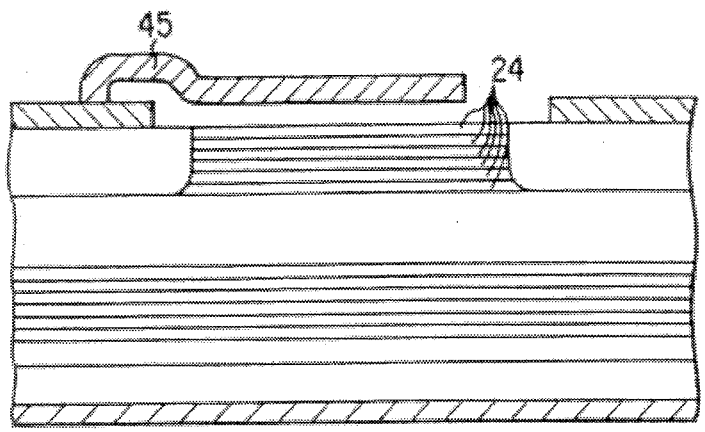
F I G. 22
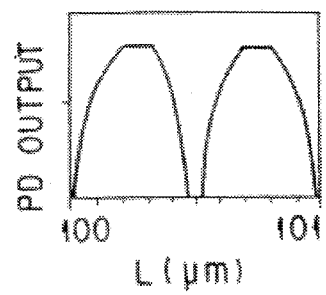
F I G. 23C
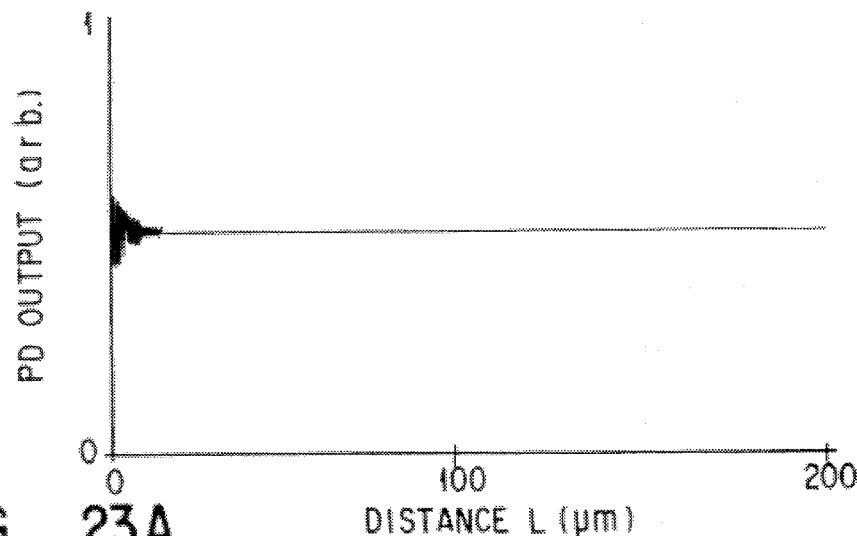
F I G. 23A
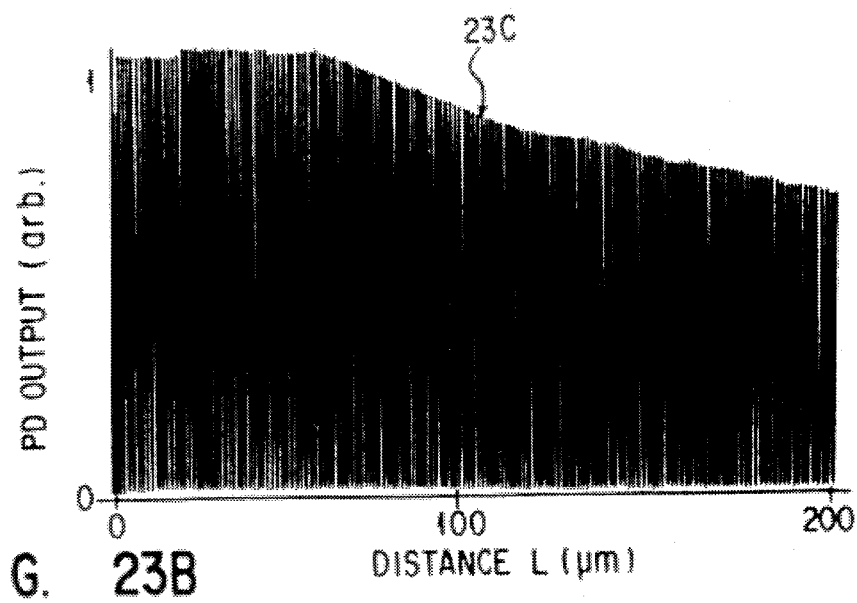
F I G. 23B

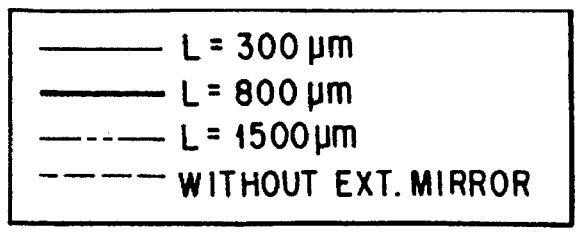
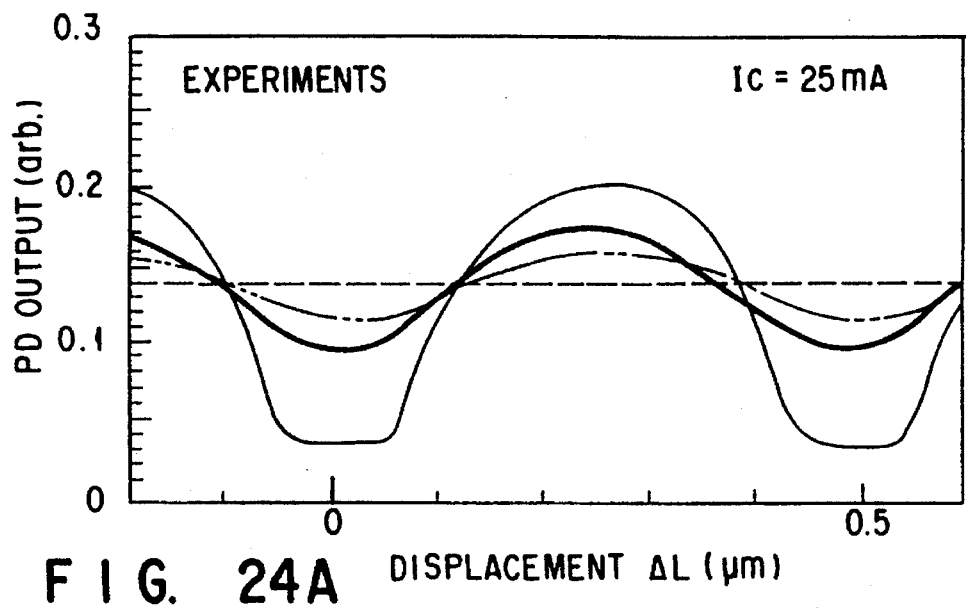
FIG. 24A
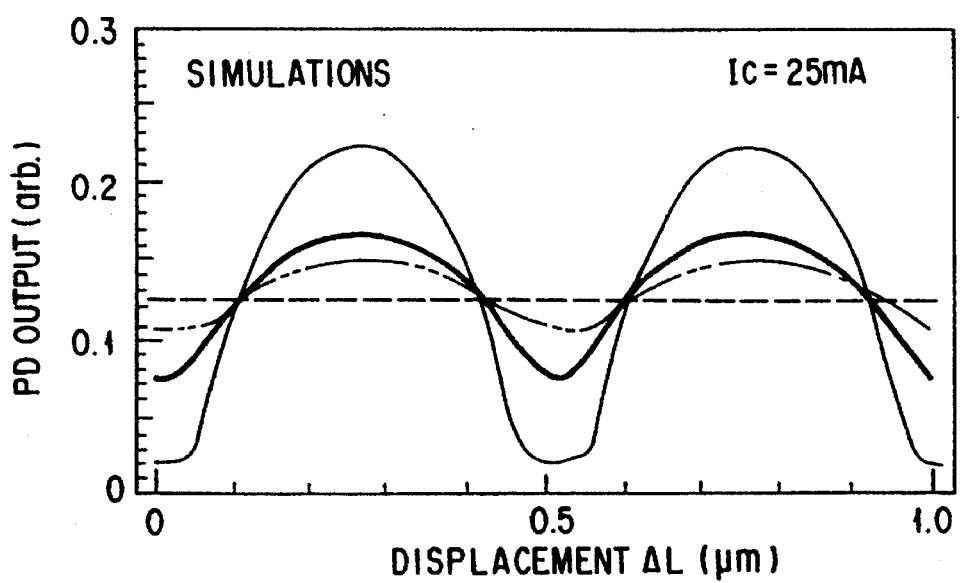
FIG. 24B

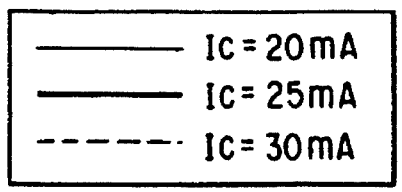
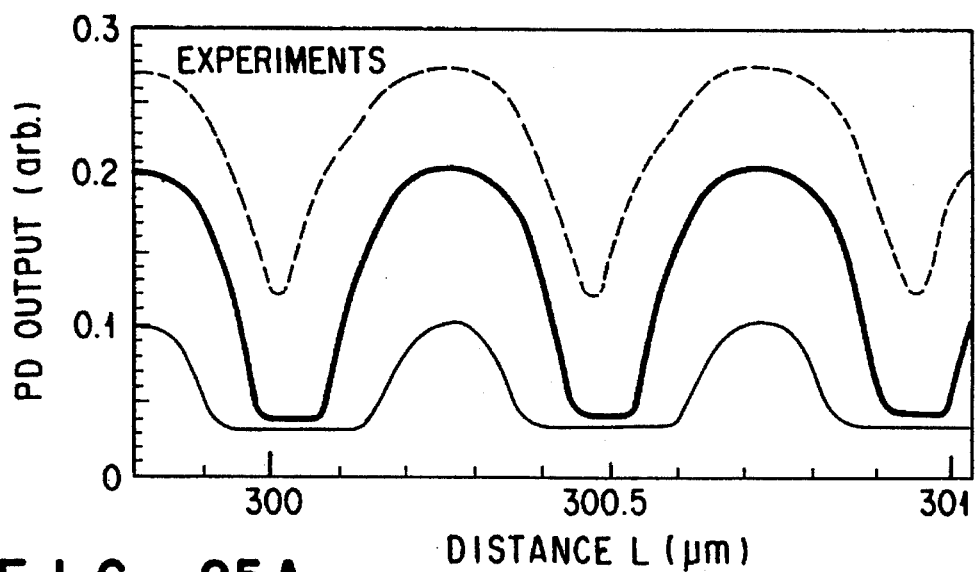
F I G. 25A
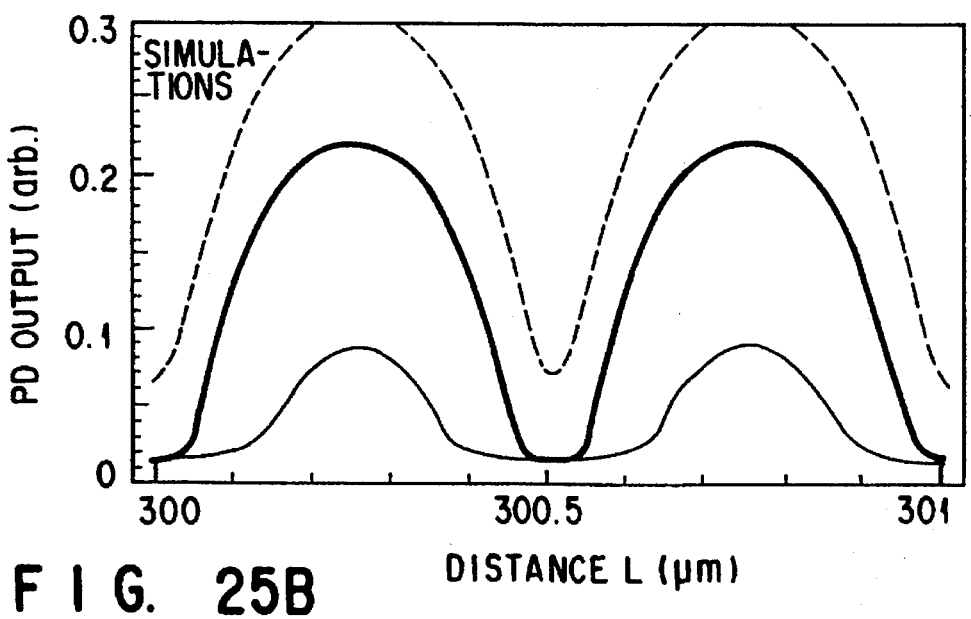
F I G. 25B

5,619,318

OPTICAL DISPLACEMENT SENSOR

This application is a continuation-in-part of application Ser. No. 08/287,169, filed Aug. 8, 1994, (abandoned).

BACKGROUND OF THE INVENTION

1. Field of the Invention

The present invention relates to an optical displacement sensor for optically measuring a displacement amount of an object.

2. Description of the Related Art

Conventionally, a Michelson interferometer such as shown in FIG. 20, is known as an optical mechanism for measuring a displacement amount of an object by using a semiconductor sensor.

More specifically, a laser beam emitted from a semiconductor laser 1 is shaped into a parallel beam by a collimator lens 3, and then the parallel beam is irradiated via an optical isolator 5 on a beam splitter 7, where the beam is divided in two directions.

One of the split laser beams reflected from the beam splitter 7 is irradiated on a fixed mirror 9, by which the beam is reflected back towards the beam splitter 7. The other laser beam permeates the beam splitter 7, and reflects on a mirror 11 mounted on an object (not shown). After that, this beam also reflects back towards the beam splitter 7.

The laser beams reflected on the mirrors 9 and 11 are combined back together by the beam splitter 7, and the combined beam is converged on a light reception element 15 via a converging lens 13.

At the light reception element 15, the variation state (for example, the variation state of the dark/bright contrast of an interference stripe) of the light intensity which corresponds to the difference between the two beams in optical path, is detected.

The displacement amount (S) of the mirror 11 mounted on the object is measured based on the data detected by the light reception element 15.

An optical isolator 5 has a function of shutting off the light which is returning to the semiconductor laser 1, in order to prevent problems including an oscillation mode change (mode hopping) of the semiconductor laser 1, a leap of an oscillation wavelength and a variation of the laser output.

Meanwhile, a method of measuring a displacement of an object to be measured, by using a complex resonator having a structure in which a laser beam is irradiated from the semiconductor laser 1 to the object and the reflection light from the object is sent back to the semiconductor laser 1 has been proposed (see Jap. Pat. Appln. KOKAI Publication No. 60-256079), and the structure thereof is shown in FIG. 21.

As shown in FIG. 21, a laser beam emitted from the semiconductor laser 1 is converted into a parallel beam by the collimate lens 3, and then divided into two direction normally crossing with each other by the beam splitter 7.

One of the split beams is irradiated vertically on the external mirror 11 mounted on the object, and the reflection light returns to the semiconductor laser 1 via the common path as of the emitted light beam. The other laser beam is irradiated on an optical detector 5, where the optical output thereof is measured.

Supposing that the external mirror 11 is displaced in an X or −X direction, the displacement of the external mirror 11 can be measured based on the phase relationship between an emission light of the semiconductor laser 1 and its reflection light. In detail, each time the displacement of the external mirror 11 changes by a half of the oscillation wavelength $\lambda_0$ (that is, $\lambda_0/2$), the intensity of the optical output changes. By utilizing such a phenomenon, the displacement of the external mirror 11 can be measured.

However, since an interferometer such as shown in FIG. 20, includes a lens 13, an optical isolator 5, a beam splitter 7, mirrors 9 and 11, and the like, which are arranged in combination to divide or synthesize a laser beam. Therefore, it requires a large volume to assemble a whole optical system, and therefore it is difficult to integrate those members together as a very small micro sensor.

The structure shown in FIG. 21 necessitates a collimation lens 3 for collimating a laser beam, and a beam splitter 7, and therefore the downsizing of the sensor is limited.

Further, in the case where a regular semiconductor laser having a stripe structure is used in the structure shown in FIG. 21, the oscillation mode in the semiconductor laser changes (mode hopping) as the amount or phase of the light returning to the semiconductor laser changes, and therefore the variation of the optical output is likely to occur. Accordingly, a regular change in optical output in every $\eta_0$ cycle with respect to a displacement x and a change in optical output due to irregular mode hopping, overlap with each other, and an accurate measurement of the displacement amount of the object cannot be carried out.

Further, U.S. Pat. No. 5,331,658 discloses a sensor which uses a surface-emitting laser such as shown in FIG. 22. In this document, reflection means 45 is provided above an upper mirror 24 of the surface-emitting laser (SEL) with a displacement of a ¼ or ½ wavelength therebetween, and the sensor operates in the following manner. By utilizing a change in the threshold current of SEL due to a deformation of reflection means 45, a change in an environment such as pressure or temperature can be detected.

In this prior art document, however, the reflection means 45 is integrally provided on the surface-emitting laser (SEL), and is located at a position only a ½ (or ¼) wavelength away from the upper mirror 24 of the surface-emitting laser (SEL).

Further, this prior art document does not disclose how the sensor operates in the case where the displacement between the external reflection means 45 and the upper mirror of the surface-emitting laser is larger than the ½ wavelength.

Therefore, not only a periodical change in laser output caused by a positional change of the means when the reflection means is located a ½ wavelength or more away is not exhibited, but also the detection range is limited to a maximum of ½ wavelength. Therefore, the detection range is narrowed (for a wavelength of laser of 1000 nm, the range is 500 nm–0.5 μm). Further, it is very difficult to build the reflection means accurately at a position a ½ (or ¼) wavelength away from the surface.

SUMMARY OF THE INVENTION

The object of the present invention is to provide a compact optical displacement sensor which has a very simple structure and is capable of a highly accurate displacement measurement.

In order to achieve the above object, the present invention employs the following technical idea. That is, a change in relative position between a vertical-cavity surface-emitting laser and an external reflection member can be detected by measuring a periodic variation of a laser output caused by the change in the relative displacement between the surface-emitting laser and the external reflection member, or a periodic variation in mirror loss of the compound cavity by using detection means.

Therefore, according to the present invention, the beam radiation angle of the vertical-cavity surface emitting laser is small, and therefore there is no need to provide an optical system (for example, lens) between the surface-emitting laser and the external mirror. Further, the vertical-cavity surface-emitting laser has a high capability of maintaining a single oscillation mode at all times, without being influenced by returning light. Consequently, the variation of the optical output or oscillation wavelength, due to the mode hopping caused by returning light, which is a well-known problem with semiconductor lasers, can be suppressed without providing a light-shutting optical system such as an optical isolator.

In the present invention, the external reflection means is located a predetermined displacement (oscillating wavelength of surface-emitting light of $\lambda$ or more, preferably, 5 $\lambda$ or more and $10^5$ $\lambda$ or less) away from the surface-emitting laser, so that the periodical change In laser output caused by the positional change appears, by utilizing the characteristics unique to the surface-emitting light. Therefore, not only the detection range is widened, but also an extremely simple structure can be achieved for easy assembly. Consequently, a compact optical displacement sensor capable of measuring an output change in laser oscillation beam an high reliability, based on a relative displacement between the external reflection means and the vertical-cavity surface-emitting laser, can be provided.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIGS. 1A and 1B are diagrams designed to illustrate the principle applied to the present invention;

FIG. 2 is a diagram showing a structure of a composite resonator, designed to illustrate an operation of the above principle;

FIG. 3A is a diagram showing a relationship between a wavelength and a reflectance, FIG. 3B is a diagram showing a relationship between a wavelength and a phase condition, and FIG. 3C is a relationship between a displacement amount and a laser output;

FIG. 4A is a diagram showing an overall structure of an optical displacement sensor according to the first embodiment of the present invention, and FIG. 4B is a diagram showing a structure of a vertical-cavity surface emitting laser;

FIGS. 5A, 5B and 5C are diagrams showing structures of an optical displacement sensor according to the second embodiment of the present invention, specifically, FIG. 5A illustrates the case where a semi-transparent mirror is used as the external mirror, FIG. 5B illustrates the case where a photodetector made of a semiconductor substrate is used in place of the external mirror, and FIG. 5C illustrates a structure of the photodetector shown in FIG. 5B;

FIG. 6A is a diagram showing a structure of an optical displacement sensor according to the second embodiment of the present invention, and FIG. 6B is a diagram showing a structure of a vertical-cavity surface emitting laser made by integrating photodetectors;

FIGS. 7A and 7B are diagrams showing structures of an optical displacement sensor according to the third embodiment of the present invention, specifically, FIG. 7A illustrates the case where an external mirror having a concave spherical shape is employed, and FIG. 7B illustrates the case where a collimating lens is provided on an optical path between the external mirror and the vertical-cavity surface-emitting layer;

FIG. 8 is a diagram showing a structure of an optical displacement sensor according to the fourth embodiment of the invention;

FIGS. 9A and 9B are diagrams showing structures of an optical displacement sensor according to the fifth embodiment of the present invention, specifically, FIG. 9A is a cross section of a part of an external mirror, and FIG. 9B is a plan view thereof;

FIG. 10A illustrates the case where a ferroelectric film for shifting the phase of reflection light is formed, FIG. 10B illustrates the case where the reflecting surface of the external mirror is etched such as to shift the phase of the reflection light, and FIG. 10C illustrates the relationship between a displacement of the external mirror and a light receiving intensity;

FIG. 12A is a cross sectional perspective view showing a structure of an optical displacement sensor according to the eighth embodiment of the present invention, and FIG. 12B is a diagram showing the relationship between a pressure from outside and a light receiving intensity;

FIG. 15 is a diagram showing a step of manufacturing the sensor shown in FIG. 12A;

FIG. 16 is a diagram showing a step of manufacturing the sensor shown in FIG. 12A;

FIG. 17A is a diagram showing a structure of an optical displacement sensor according to the ninth embodiment and FIG. 17B is a diagram showing a remodeled version thereof;

FIG. 18A is a diagram showing a structure of an optical displacement sensor according to the tenth embodiment and FIG. 18B is a diagram showing a remodeled version thereof;

FIG. 19 is a diagram showing a structure of an optical displacement sensor according to the eleventh embodiment;

FIG. 20 is a diagram showing a basic structure of the Michelson interferrometer;

FIG. 21 is a diagram showing a structure of a conventional optical displacement sensor of a compound cavity type;

FIG. 22 is a diagram showing the structure of the sensor disclosed in U.S. Pat. No. 5,331,658;

FIG. 23A is a diagram showing the PD output in the case where an edge-emitting type stripe laser is used as the light source, FIG. 23B is a diagram showing the PD output in the case where a surface-emitting type stripe laser is used as the light source, and FIG. 23C is an enlarge diagram showing the section indicated by reference numeral 23C in FIG. 23B;

FIG. 24A is a diagram showing the relationship between the displacement and the PD output, obtained from the experimental results, and FIG. 24B is a diagram showing the relationship between the displacement and the PD output, based on the calculation results; and FIG. 25A is a diagram showing the relationship between the driving current and the PD output, obtained from the experimental results, and FIG. 25B is a diagram showing the relationship between the driving current and the PD output, based on the calculation results.

DETAILED DESCRIPTION OF THE PREFERRED EMBODIMENTS

Figure 10A:
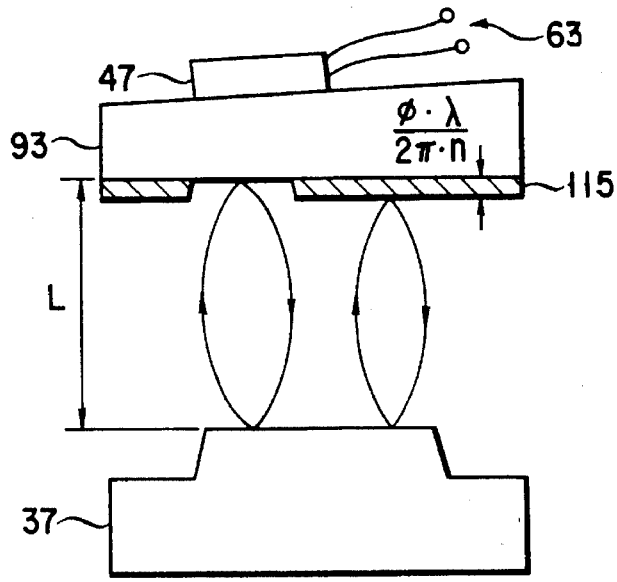
FIGS. 10A, 10B and 10C are diagrams showing structures of an optical displacement sensor according to the sixth embodiment of the present invention, specifically.

The basic principle of the present invention will now be described, and embodiments to which the principle is applied will be provided.

FIG. 1 is a diagram showing the basic structure of the optical system including a compound cavity consisting of a vertical-cavity surface-emitting laser 19 and an external mirror 21, which operates on the basic principle of the present invention. An intensity variation of a laser beam of the compound cavity or a variation of mirror loss is detected by detection means 23.

Known examples of the detection method by using the detection means 23 are: a method of directly detecting the intensity variation of a laser beam by means of a photodetector 25, and a method of detecting a variation of the mirror loss caused by a relative displacement between the external mirror and the vertical-cavity surface-emitting laser 19 (i.e. mirror loss of the surface-emitting laser 19 containing the external mirror 21), by means of PN junction potential difference detecting means, based on the variation of the carrier density in the surface-emitting laser.

The position of the photodetector 25 is not limited to the side of the external mirror 21 which opposes to the surface emitting laser 19. For example, it is a possibility that the photodetector 25 is placed on an opposite side to the external mirror 21, with respect to the surface-emitting laser 19, or on the side of the beam emitting window of the surface-emitting laser 19.

Further, the phase of the laser beam returning from the external mirror 21 is determined by a relative displacement (S) between the external mirror 21 and the vertical-cavity surface-emitting laser 19. Specifically, the laser beam output varies in a period of a displacement amount corresponding to ½ of the wavelength ($\lambda_0$) of the laser beam.

The displacement amount of such a case is calculated via a counting device 29 and an operation device 31. More specifically, the variation number Nc (the number of times of variations) of the laser beam output counted by the counting device 29 is input to the operation device 31. The operation device 31 carries out an operation process on the input data (Nc) based on the following calculation formula.

$$\Delta L = Nc \cdot \lambda_0 / 2n \tag{1}$$

n: refractive index of a medium between the external mirror 21 and the vertical-cavity surface emitting laser 19.

The value obtained from this calculation is a displacement amount ($\Delta L$).

In the following description, the device is operated in the atmosphere, and therefore the refractive index (n) is set at 1.0 (n=1.0).

Further, the description will be provided in connection with the case where the photodetector 25 is used as detection means for detecting the variation of the laser optical intensity or the variation of the mirror loss of the compound cavity; however, as long as specified so, the detection means 27 for detecting the variation of the mirror loss of the resonator can be employed in place of the photodetector 25.

Next, in order to clarify the operation principle in more detail, a compound cavity in which a vertical-cavity surface-emitting laser 19 having a distributed Bragg-reflector (DBR) type mirror (not shown) is employed as the semiconductor laser which outputs a single mode, will be described in detail.

In the following description, it is assumed that the oscillation mode of the laser is considered with regard to only the longitudinal mode which corresponds to the cavity direction, and the lateral mode which is normal to the longitudinal mode, is controlled by a single mode. In order to control the lateral mode so that the lateral mode is made into the signal mode, the measurement of the cross section which is vertical to the cavity, of the cross sectional measurements of the waveguide in the surface-emitting laser should be limited to a given value (about 10 µm) or less.

When the device is made to have a structure which satisfies:

$$L \gg l_{eff} \tag{2}$$

where $l_{eff}$ represents the effective length of the laser cavity of the vertical-cavity surface-emitting laser 19, and L represents the distance between the laser emitting surface and the external mirror 21, the characteristics shown in FIGS. 3A to 3C can be obtained by setting, for example, the value of leff smaller than ⅒ of L.

As shown in FIG. 3A, the reflectivity $R_{tot}$ of the total compound cavity is a value obtained by demodulating the reflectivity $R_{DBR}$ of the DBR type mirror with the period $\Delta \lambda_{FP}$ due to the interference between the reflection light from the external mirror 21 (see FIG. 2) and the light resonating within the vertical-cavity surface-emitting laser 19.

$\Delta \lambda_{FP}$ is given under the condition of formula (1) by:

$$\Delta \lambda FP = \frac{\lambda_0^2}{2 \cdot L} \tag{3}$$

where $\lambda_0$ represents a oscillation wavelength.

Meanwhile, as shown in FIG. 3B, the wavelength interval $\Delta \lambda_{fp}$ which satisfies the phase condition of the compound cavity by the vertical-cavity surface-emitting laser 19 solely is given by:

$$\Delta \lambda_{fp} = \frac{\lambda_0^2}{2 \cdot n_{eff} \cdot l_{eff}} \tag{4}$$

where $n_{eff}$ represents an effective refractive index in which the wavelength dispersion of the laser waveguide (not shown) is taken into consideration.

Usually, the band width $\Delta \lambda_{DBR}$ (see FIG. 3A) in which the reflectivity of the DBR formed of the semiconductor multilayer mirror (not shown) of the vertical-cavity surface-emitting laser 19 becomes ½ of its peak value, is about 20 nm, and therefore that the following relationship can be established with consideration of the condition of the formula (2):

$$\Delta\lambda_{fp} \geq \Delta\lambda_{DBR} >> \Delta\lambda_{FP} \tag{5}$$

Typical values are $\Delta\lambda_{fp}=31$ nm, $\Delta\lambda_{FP}=4.7$ nm where $\lambda_0=0.97$ μm, L=100 μm, $l_{eff}=3.5$ μm and $n_{eff}=4.3$.

In the case of a conventional semiconductor laser having a stripe structure, $\Delta\lambda_{fp}$ is about 1 nm, whereas in the case of the vertical-cavity surface-emitting laser, $\Delta\lambda_{fp}$ is as large as several tens of nanometers as aforementioned, which is almost the same as $\Delta\lambda_{DBR}$. Therefore, as shown in FIGS. 3A and 3B, there are only one or two modes which satisfy the phase condition shown in FIG. 3B in the wavelength region in which the DBR mirror exhibits a high reflectivity.

Therefore, the vertical-cavity surface-emitting laser has a very stable mode, and the mode hopping rarely occurs.

In the vertical-cavity surface-emitting laser which does not have a DBR mirror, the $\Delta\lambda_{fp}$ is several tens of nanometers. Further, it is known, due to the wavelength dependency of the optical gain of the active layer, a mode having a different wavelength by $\Delta\lambda_{fp}$ exhibits a large mode gain difference, and the mode hopping of the laser oscillation mode does not easily occur.

Further, supposing a distance L between the external mirror 21 and the vertical-cavity surface emitting laser 19 (see FIG. 2) varies by $\Delta L$, the wavelength characteristics of the reflectivity $R_{tot}$ of the combination of the upper (DBR) reflector of the surface-emitting laser in the complete oscillator, and the external mirror is shifted by $\delta\lambda_{FP}$ as shown in FIG. 3A, and represented by $R'_{tot}$.

The shifting amount "$\delta\lambda_{FP}$" can be expressed by:

$$\delta\lambda_{FP}=\lambda_0 \cdot \Delta L/L \tag{6}$$

In order to have a laser beam emission from the surface-emitting laser 19, the optical gain $g_{th}$ (cm$^{-1}$) created by the active layer of the semiconductor laser, and the loss of the compound cavity must be balanced to each other.

When the thickness of the active layer of the vertical-cavity surface-emitting 19 is represented by d, the internal loss of the waveguide is represented by $\alpha_i$ (cm$^{-1}$), the mirror loss of the whole compound cavity standardized by $l_{eff}$ is represented by $\alpha_{m,tot}$(cm$^{-1}$), and the reflectivities of the mirrors located in the front and back stages of the surface-emitting laser 19 are represented by $R_1$ and $R_3$:

$$\frac{d}{l_{eff}} g_{th} = \alpha_i + \alpha_{m,tot} \tag{7}$$

$$\alpha_{m,tot} = \frac{\ln[R_1\beta \cdot R_2]}{2l_{eff}} \tag{8}$$

In the above equations, β is a factor in which the external mirror 21 modulates the reflectivity of the DBR of the front surface of the surface-emitting laser 19.

This factor β is a value determined by the reflectivity $R_{EX}$ of the external mirror 21, and the optical phase and returning light amount from the external mirror 21, which corresponds to the distance L between the external mirror 21 and the surface-emitting laser 19, and the value is strongly modulated along an envelope which gradually decreases with respect to the distance L, at half a period of the optical wavelength (i.e. $\lambda_0/2$).

As shown in FIG. 3C, as the distance L of the external mirror 21 changes, the optical output is demodulated at a period of $\lambda_0/2$. Therefore, the displacement amount (S, see FIG. 1) of the external mirror 21 can be measured by counting the number of times of the variations of the optical output 29 (see FIG. 1), and applying the counted value into the formula (1).

The laser beam emitted from the surface-emitting laser 19 has a small divergence angle as compared to that of a conventional semiconductor laser, which is about 5 deg at a full-width at half-maximum (FWHM). However, since the beam is not a perfect parallel beam, the factor β decreases very much as the distance L increases to about several tens of centimeters. Consequently, the influence of the external mirror 21 on the laser oscillation substantially never appears.

In order to numerically study the above-described phenomenon, the relationship between the displacement between the reflection surface of the external mirror and the surface-emitting laser, and an output of the photodetector (to be accurate, an output of the photodetector provided for receiving a laser being emitted to an opposite side of the external mirror), is calculated, and the result thereof is shown in FIG. 23. This figure shows the results calculated by use of corresponding typical structural parameters, as for the case where a conventional edge-emitting type stripe laser is used as the light source (FIG. 23A) and the case where the surface-emitting laser is used as the light source (FIG. 23B). The detail of the calculation method Is disclosed in the thesis written by the inventors of the present invention (E. Tamamoto et el., IEEE Proceeding of Micro Electro Mechanical Systems, (1995) pages 227–231). The main parameters used in the calculation in the case where the surface-emitting laser is used as the light source are:

Diameter of Emitting Window of Laser: $W_{b,SEL}=5$ μm;
Reflectivity of External Reflection Mirror: $R_{EX}=0.95$;
Reflectivity of Internal Mirror of Surface-emitting Laser Unit: $R_{1,SEL}=R_{2,SEL}=0.98$;
Effective Cavity Length of Surface-emitting Laser Unit: $l_{eff,SEL}=1$ μm;
Threshold Current of Surface-emitting Laser Unit: $1_{th,SEL}=5$ mA;
Driving Current of Surface-emitting Laser Unit: $1_{c,SEL}=10$ mA; and
Wavelength of Laser Beam: $\lambda=1$ μm.

On the other hand, in the case where the edge-emitting laser is used as the light source, the parameters are:

$W_{b,edge}=0.8$ μm;
$R_{EX}=0.95$;
$R_{1,edge}=R_{2,edge}=0.3$;
$l_{eff,edge}=300$ μm;
$1_{th,edge}=25$ mA;
$1_{c,edge}=30$ mA; and
$\lambda=1$ μm.

The beam emitting portion of the edge-emitting laser has a flat rectangular or flat elliptical shape. The above $w_{b,edge}$ value was a root mean square value, supposing that the typical measurements of the emitting portion was 2.5 μx0.3 μm. As is clear from FIGS. 23A and 23B, in the case where the conventional edge-emitting laser is used as the light source, the area of L (that is, $L_{max,edge}$) under which the intensity modulation of the laser beam induced by the optical feedback can be observed, is only $L_{max,edge} \leq 5$ μm≠5 λ, whereas in the case where the surface-emitting laser is used as the light source, the area of L (that is, $L_{max,SEL}$) under which the intensity modulation of the laser beam induced by the optical feedback can be observed, can be expanded several hundreds of times or more.

The range of L ($L_{max}$) under which the intensity modulation of the laser beam induced by the optical feedback can be observed is determined by the divergence angle Δθ of the laser beam, and the $L_{max}$ can be obtained approximately from the following equation:

$$L_{max,SEL} = L_{max,edge} \cdot \sin\Delta\theta_{edge,v} \times \sin\Delta\theta_{edge,h} \left( \frac{W_{b,SEL}}{\sin\Delta\theta_{SKL} \cdot W_{b,edge}} \right)^2 \quad (9)$$

where $\Delta\theta_{edge,v}$ and $\Delta\theta_{edge,h}$ represent optical beam divergence angles of the edge-emitting laser in the vertical and horizontal directions, respectively, and $\Delta\theta_{SEL}$ represents an optical beam divergence angle of the surface-emitting laser.

For a typical edge-emitting laser, $W_{b,edge} \neq 0.8$ μm, $L_{max,edge} \leq 5$ μm ≠ 5 λ, $\Delta\theta_{edge,v} \neq 30$ degrees, and $\Delta\theta_{edge,h} \neq 15$ degrees, and therefore it can be further estimated as follows:

$$L_{max,SEL} \approx \left( \frac{W_{b,SEL}}{\sin\Delta\theta_{SEL}} \right)^2 \lambda \quad (10)$$

For example, it can be estimated as a typical example that $L_{max,SEL} \neq 1700 \lambda$ where the diameter of the laser emitting window of the surface-emitting laser is 5 μm and the divergence degree is 7 degrees. In the case of a surface-emitting laser, $W_{b,SEL}$ and $\Delta\theta_{SEL}$ can be relatively freely set by appropriately designing the diameter of the emitting window. However, if the diameter of the emitting window of the surface-emitting laser is excessively increased, the threshold current is increased, which makes it difficult to perform laser oscillation. According to a judgement based on the results of our sample fabrication of the surface-emitting laser and the data provided in the documents of studies, the maximum diameter of the emitting window is about 30 μm, and the divergence angel is about 5 degrees. Consequently, in the case where no lens is used in the surface-emitting laser, it is expected from Equation (10) that $L_{max,SEL} \neq 120000\lambda \neq 10^5 \lambda$ at maximum. Therefore, with use of a surface-emitting laser of the light source, it becomes possible to obtain a modulation signal of the laser output with respect to the displacement of the external mirror even in the range provided below, within which the signal cannot be obtained in the case where the conventional edge-emitting laser which uses no lens, is used as the light source.

$$5\lambda < L \leq 10^5 \lambda \quad (11)$$

Further, the inventors of the present invention discovered that the shape of the characteristic curve (to be simply called as output curve of the sensor) representing a change in the output of the photodetector, with respect to the displacement ΔL of the external mirror, can be controlled by changing the structural parameters or driving parameters of the sensor (E. Tamamoto et al., IEEE Proceeding of Micro Electro Mechanical Systems, (1995) pages 227–231). (The case where among the emitted light beams of the surface-emitting laser, an output of a laser beam emitted to an opposite side of the external mirror, is detected by the photodetector, will now be described.)

FIGS. 24A and 24B show an experimental result (FIG. 24A) and a calculation result (FIG. 24B) of a change in shape of the output curve of the sensor along with a change in distance L between SEL and the external mirror as a parameter. Similarly, FIGS. 25A and 25B show an experimental result (FIG. 25A) and a calculation result (FIG. 25B) of a change in shape of the output curve of the sensor along with a change in driving current $I_C$ of the surface-emitting laser, as parameter. The divergence angle $\Delta\theta_{SEL}$ of the surface-emitting laser is very small but not zero. Therefore, when L is small, the output curve of the sensor takes such a form that the laser oscillation is turned ON/OFF, whereas when L is increased, the light quantity of the laser beam fed back from the external mirror to the surface-emitting laser is decreased, and therefore the form of the curve is varied to a smooth quasi-sinusoidal type.

When $I_C$ is small, the output curve of the sensor takes such a form that the laser oscillation is turned ON/OFF, whereas when L is maintained at constant and $I_C$ is increased, the laser oscillation of the surface-emitting laser as itself is stabilized, and not easily influenced by the feedback beam from the outside, varying the form of the curve to a smooth quasi-sinusoidal type. Apart from this, there are some other methods of controlling the output curve of the sensor. For example, the output curve of the sensor can be approximated to a smooth quasi-sinusoidal curve by reducing the diameter of the emitting window of the surface-emitting laser, or decreasing the reflectively of the external mirror.

The above technique for controlling the output waveform of the sensor is useful to optimize the output waveform of the sensor in accordance with the usage of the sensor. For example, in the case where the displacement ΔL is measured at a resolution of about λ/2, the sensing of the displacement of the external mirror is carried out under such a condition that the laser oscillation is turned ON/OFF, and the number of appearances of the peak of the output from the light receiving element is counted with a counter or the like. Thus, an electromagnetic-noise-resisting and simple displacement detection circuit can be formed. In contrast, in the case where ΔL must be detected continuously at a resolution finer than λ/2, the condition is set so that the output curve of the sensor becomes a smooth quasi-sinusoidal curve and the phase of the output waveform from the light-receiving element is divided, thus realizing a high-resolution displacement detection.

An optical displacement sensor according to the first embodiment of the present invention, to which the above-described principle is applied, will be explained with reference to FIG. 4.

FIG. 4 briefly shows a structure of a miniature displacement sensor to which the above principle is applied.

As shown in FIG. 4A, the miniature displacement sensor of the present invention includes a vertical-cavity surface-emitting laser 37 fixed in a casing 35 via a heat sink 33, an external mirror 43 set at a lower end portion of a supporting rod 41 put into the casing 35 through a guide hole 39 made therein, so as to oppose to the vertical-cavity surface-emitting laser 37, a mounting portion 45 having such a structure that an object to be measured (not shown) can be mounted to an upper end portion of the supporting rod 41, which is located on the side projecting from the casing 35, and a photodetector 47 set on the reflection surface side of the external mirror 43.

The external mirror 43 is mounted to the lower portion of the supporting rod 41 such that the reflection surface thereof is set normal to the optical axis of the laser beam 49, and the mirror 43 is formed such as to be movable in the direction of the optical axis by moving the supporting rod 41 by the mounting portion 45 in the direction indicated by arrow S in the figure.

To the vertical-cavity surface-emitting laser 37, a proximal end portion of laser driving electric wiring 53 put into the casing 35 via the first through-hole 51, is connected, and a distal end portion of the electric wiring 53 is electrically connected to a semiconductor laser (LD) driving power supply 57 via a laser driving electrode terminal 55.

With such a structure, a driving current output from the LD driving power supply 57 is supplied to the vertical-cavity surface-emitting laser 37 via the laser driving electrode terminal 55 and the laser driving electric wiring 53.

To the photodetector 47, a proximal end portion of light intensity detecting electric wiring 61 put into the casing 35 via the second through-hole 59, is connected, and a distal end portion of the electric wiring 61 is electrically connected to current detection means 65 via a light intensity detecting current terminal 63. The current detection means 65 is connected to the photodetector power supply 67, and detection data output from the current detection means 65 can be output to an operation device 71 via a counting device 69.

The photodetector 47 should preferably be adhered to a periphery portion of the laser beam (49) irradiation area on the reflection surface of the external mirror 43, in order to suppress the influence of the reflection light from the photodetector 47.

FIG. 4B is an enlarged view of the structure of the vertical-cavity surface-emitting laser 37.

As shown in FIG. 4B, an N-type semiconductor buffer layer 75, a lower distribution Bragg reflector 77 formed of a semiconductor multilayer film, an N-type semiconductor cladding layer 79, an active layer 81, a P-type semiconductor cladding layer 83 and an upper distribution Bragg reflector 85 made of a P-type semiconductor multilayer film are laminated on an N-type semiconductor substrate 73. Then, etching is carried out to the depth of the N-type semiconductor cladding layer 79 to leave the cavity portion, and the electrode contact portion of a silicon dioxide film 87 applied on the surface of the cavity is opened. Thus, P-type and N-type electrodes 89 and 91 are formed on the upper distribution Bragg reflector 85 the N-type semiconductor cladding layer 79, respectively.

For the purpose of suppressing the reflection of the laser beam 49 from the rear surface of the substrate, it is preferable that a material which can absorb a laser beam should be selected to make the N-type semiconductor substrate 73 and the N-type semiconductor buffer layer 75.

The laser beam 49 is converted into an electric signal by the photodetector 47, and then input to the counting device 69 via the current detection means 65, where the variation number of the optical intensity is counted. The counted data is input to the operation device 71, and the operation based on the formula (1) is carried out.

As a result, a relative displacement amount ($\Delta L$) between the vertical-cavity surface-emitting laser 37 and the external mirror 43 is calculated.

As described above, the surface-emitting laser applied to this embodiment exhibits a small beam radiating angle, and therefore it is not necessary to provide another optical system (for example, lens) between the surface-emitting laser and the external mirror. Further, since the surface-emitting laser can maintain a single oscillation mode at all times without having an influence on the returning light, the variance of the optical output or oscillation wavelength due to the mode hopping, caused by the returning light, which is a problem with a conventional semiconductor laser, can be suppressed without providing a light-shutting optical system such as an optical isolator.

Therefore, the variation of the output of the laser oscillation beam based on a relative displacement between the external mirror and the surface-emitting laser, can be measured at a high accuracy in a wide displacement range.

Thus, a compact optical displacement sensor having a very simple structure and capable of a highly accurate displacement measurement can be provided.

Next, an optical displacement sensor according to the second embodiment of the present invention will be described with reference to FIGS. 5A–5C, 6A and 6B.

In the description of this embodiment, the same elements as those in the first embodiment are designated by the same reference numerals, and the explanation of these elements will be omitted.

As shown in FIG. 5A, an external mirror 93 applied to this embodiment, is a semitransparent type, and the photodetector 47 is mounted on the rear surface side (opposite side to the reflection surface) of the external mirror 93.

In the case of this embodiment, it is not necessary to consider an influence of the reflection light from the photodetector 47, and therefore the position of the photodetector 47 can be arbitrarily set.

The external mirror 93 is shaped by cutting off, for example, the rear surface thereof obliquely with respect to the optical axis of the laser beam in order to avoid an influence by the reflection light from the rear surface (opposite side to the reflection surface).

As can be seen in FIG. 5B, in this embodiment, a photodetector 95 formed on a semiconductor substrate is provided in place of the external mirror.

The photodetector 95 has a structure of photodiode shown in FIG. 5C, in which an N-type semiconductor buffer layer 75, a low-concentration light absorbing layer 97 and a P-type contact layer 99 are laminated on an N-type semiconductor substrate 73 on which an N-type electrode 91 is formed, and the electrode contact portion of a silicon dioxide film 87 applied on the P-type contact layer 99 is opened so that the P-type electrode 89 is connected to the P-type contact layer 99.

The silicon dioxide layer 87 is not only a protection film for the portion other than the P-type electrode 89, but also has a function as means for adjusting the reflectivity.

For example, in the case where the thickness of the silicon dioxide layer 87 corresponds to ½ of the optical wavelength, the reflectivity of the whole reflection mirror is about the same as that of the semiconductor substrate, or where the thickness corresponds to ¼ of the optical wavelength, the reflectivity is minimum.

For the purpose of suppressing the reflection from the rear surface (the surface of the side not opposing the surface-emitting laser 37) of the photodetector 95, the N-type semiconductor substrate 73 and the N-type semiconductor buffer layer 75 should preferably be formed such that the forbidden band width of the band is smaller than the optical energy, whereby to absorb the laser beam.

As shown in FIGS. 6A and 6B, a vertical-cavity surface-emitting laser 101 in which photodetectors are integrated, is applied to this embodiment.

The surface-emitting laser 101 has a center portion, in which a surface-emitting laser area T is formed, and on both side of the area T, light detecting areas E for detecting light from the external mirror 43 are formed.

The radiation angle of the light beam from the surface-emitting laser 101 towards the external mirror 43 is small; however it has an expansion of about 5 degrees where a half-angle is taken as a half-maximum, and therefore part of the reflection light from the external mirror 43 can be measured by the light detecting area E.

With the above-described structure, the deflection of the electric wiring 61 extending from the photodetector 47 provided on the external mirror 43 (see FIGS. 4A and 4B, and FIGS. 5A to 5C) is not deformed, increasing the degree of freedom in designing of the external mirror 43, and facilitating to make the device compact.

As shown in FIG. 6B, in the vertical-cavity surface emitting laser 101, a semiconductor multilayer film is laminated as in the case shown in FIG. 4B, and subsequently, the contact portion of the N-type electrode 91, in particular, is etched from the surface to the N-type semiconductor cladding layer 79, and the light detecting areas E are formed by etching the surface to the P-type semiconductor cladding layer 83.

Next, an optical displacement sensor according to the third embodiment of the present invention will be described with reference to FIGS. 7A and 7B.

In the description of this embodiment, the same elements as those in the above embodiments are designated by the same reference numerals, and the explanation of these elements will be omitted.

This embodiment is a realization of the invention in the case where a distance between the external mirror 43 and the vertical-cavity surface-emitting laser 101 is large.

FIG. 7A shows a structure in which the external mirror 43 is shaped into such a concave sphere that the laser beam 49 is converged, and thus the laser beam is accurately fed back onto the light emitting end surface.

FIG. 7B shows a structure in which a collimating lens 105 is provided between the external mirror 43 and the surface-emitting laser 101 via a lens mounting portion 103.

Both cases differ from the conventional type in that an optical isolator or the like for preventing the mode hopping caused by the reflection light from a fixed reference mirror or external mirror 43 is not necessary.

In this embodiment, a vertical resonator type surface-emitting laser 101 in which photodetectors are integrated, is employed. Photodetectors shown in FIG. 4A and 4B, and 5A–5C may be also used.

Next, an optical displacement sensor according to the fourth embodiment of the present invention will be described with reference to FIG. 8.

In the description of this embodiment, the same elements as those in the above embodiments are designated by the same reference numerals, and the explanation of these elements will be omitted.

The optical displacement sensor of this embodiment comprises first and second casings 35a and 35b which are optically connected with each other via a single mode fiber 107. In more detail, in the first and second casings 35a and 35b, first and second collimating lens 105a and 105b are located at positions opposing to where the end portions of the single mode fiber 107 are respectively situated, and a laser beam resonates between the surface-emitting laser 101 and the external mirror 43 via the first and second collimating lenses 105a and 105b and the single mode fiber 107.

With the above structure, the section of detecting the displacement amount, that is, the second casing 35b, should be further miniaturized.

In this embodiment, a vertical-cavity surface emitting laser 101 in which photodetectors are integrated, is employed. Photodetectors shown in FIG. 4A and 4B, and 5A–5C may be also used.

Next, an optical displacement sensor according to the fifth embodiment of the present invention will be described with reference to FIGS. 9A and 9B.

In the description of this embodiment, the same elements as those in the above embodiments are designated by the same reference numerals, and the explanation of these elements will be omitted.

In the case where a great number of interference stripes are formed on an effective emission surface of a laser beam as the slope of the semitransparent external mirror 93 becomes large in the step of assembling an optical displacement sensor, the output of the photodetector 47 is averaged with respect to the phase, making it difficult to detect the displacement amount.

The condition for that one interference stripe is created on the laser emitting surface when the light beam reflecting once on the external mirror 93 interferes with the beam resonating in the surface-emitting laser as the external mirror 93 is inclined by an angle of θ, can be expressed as:

$$W_{SEL} \cdot \tan\theta = \lambda_0/4$$

where $W_{SEL}$ represents a significant diameter of the beam emitting end surface of the vertical-cavity surface emitting laser (not shown).

For example, when $W_{SEL}=5$ μm and $\lambda_0=0.97$ μm, θ=2.7 deg. Therefore, the inclination (θ) of the external mirror 93 must be kept ½ to ⅑ or less of the above value in consideration of the multiple reflection between the laser emitting surface and the external mirror 93.

FIGS. 9A and 9B disclose a method of finely adjusting the direction of the mirror, which is proposed to solve the problem when the assembling accuracy of the external mirror 93 does not reach the reference.

The external mirror 93 employed in this embodiment is adhered to the photodetector 47 via piezoelectric elements 109 placed at the four corners of the mirror.

Each piezoelectric element 109 has electrodes 111 formed on both sides thereof, and the thickness thereof can be increased/decreased by applying a given voltage to these electrodes 111 via the piezoelectric element control terminal 113.

Thus, the inclination of the external mirror 93 can be adjusted.

According to the actual adjustment method, a voltage applied to one piezoelectric element 109 is varied such that the optical output becomes its maximum, and other piezoelectric elements 109 are similarly adjusted in order. The adjustment is completed by expanding/contracting all the piezoelectric elements 109 uniformly so that the maximum light intensity value can be obtained in every $\lambda_0/2$.

Next, an optical displacement sensor according to the sixth embodiment of the present invention will be described with reference to FIGS. 10A to 10C.

In the description of this embodiment, the same elements as those in the above embodiments are designated by the same reference numerals, and the explanation of these elements will be omitted.

In this embodiment, means for measuring a displacement amount even if the moving direction of the external mirror 93 varies, which will be described below, is provided.

According to the first method, the moving direction of the external mirror 93 is judged based on the peak value of the laser output. More specifically, as shown in FIG. 3C, when the external mirror 93 moves away from the surface-emitting laser, the peak value of the laser output decreases, whereas when the mirror 93 moves towards the laser, the peak value increases. Thus, the moving direction of the external mirror 93 can be judged.

Figure 10B:
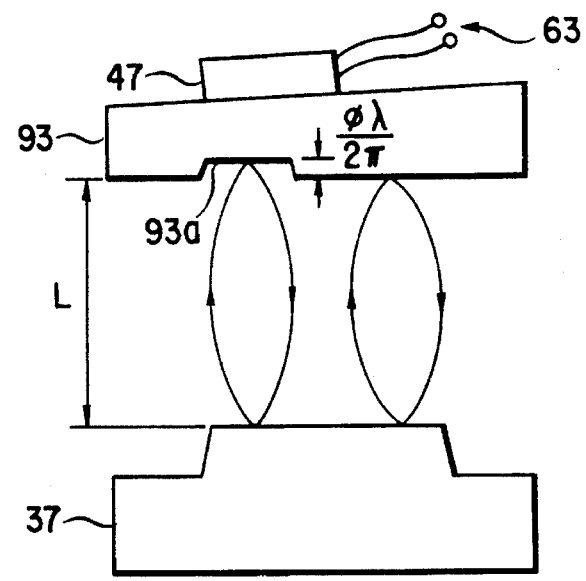
Figure 10C:
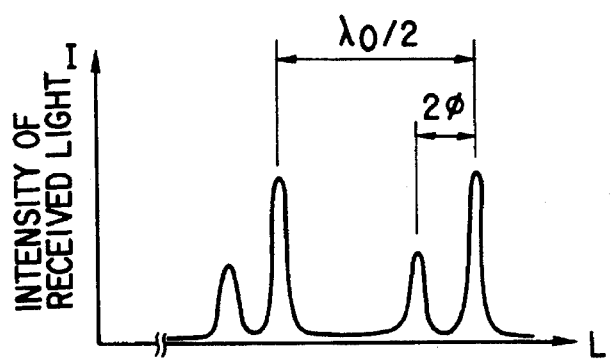

According to the second method, the moving direction of the external mirror 93 can be judged by the structure in which a phase shift is introduced to reflection light from the mirror, such as shown in FIGS. 10A to 10C.

As can be seen in FIG. 10A, a dielectric film 115 is formed on the reflection surface (surface on the side opposing to the vertical-cavity surface-emitting laser 37) of the external mirror 93 such that the phase of the reflection light beam is shifted by an amount corresponding to a phase 2φ.

The film thickness corresponding to a phase $\phi$ can be expressed as $\phi \cdot \lambda/(2\pi \cdot n)$, where n represents a refractive index of the dielectric.

As can be seen in FIG. 10B, a phase shift groove 93a is formed by etching the reflection surface of the external mirror 93 such that the phase of the reflection light beam is shifted by an amount corresponding to a phase $2\phi$.

Thus, as shown in FIG. 10C, with the photodetector 47, two pairs of light intensity peaks set out of phase by $2\phi$ at a period of $\lambda_0/2$ in accordance with a variation of a distance L between the surface-emitting laser 37 and the external mirror 93, are observed.

Thus, by appropriately setting the position and area of the region in which a phase shift is provided, the relative intensity of the laser beam, created as a comparison of the intensity for the section in which the phase shift is provided, with that for the other section, can be varied.

In the case where the external mirror 93 moves in a constant direction, the high and low peak values of the light intensity signal detected by the photodetector 47 appear alternately; however when the moving direction of the external mirror 93 is reversed, either one of the high and low peak values successively appears.

Therefore, when the moving direction of the external mirror 93 is reversed, the displacement amount including the direction of the external mirror can be measured by reversing the sign (positive/negative) of the counter numeral value of the counting device 69 (FIGS. 4A to 4C).

Figure 11A:
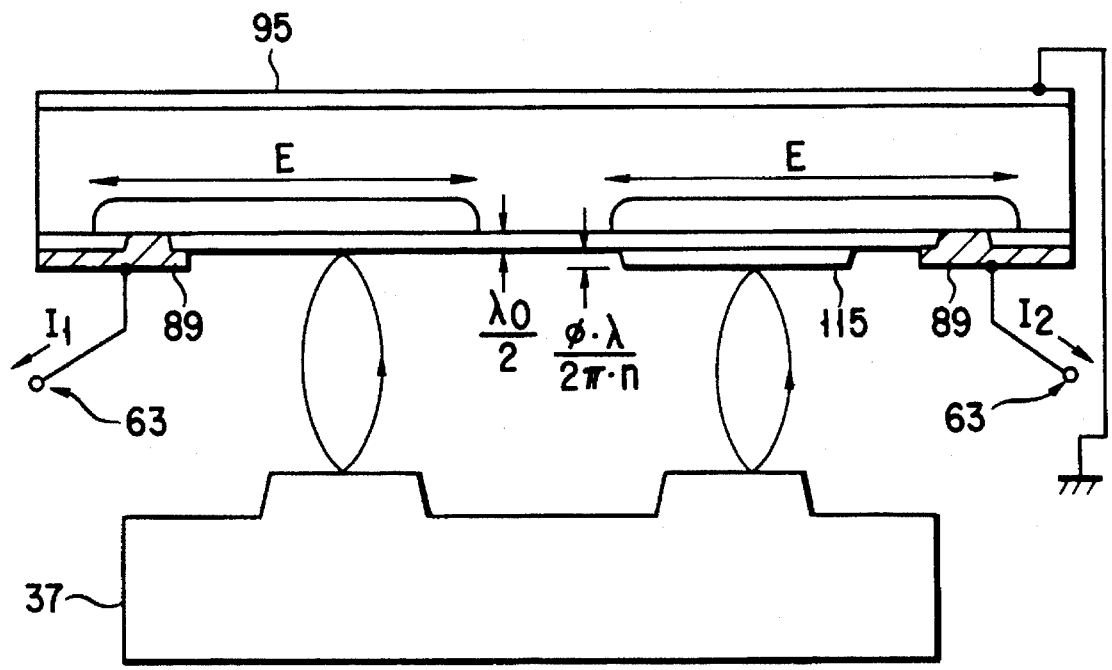
FIG. 11A is a diagram showing a structure of an optical displacement sensor according to the seventh embodiment of the present invention.
Figure 11B:
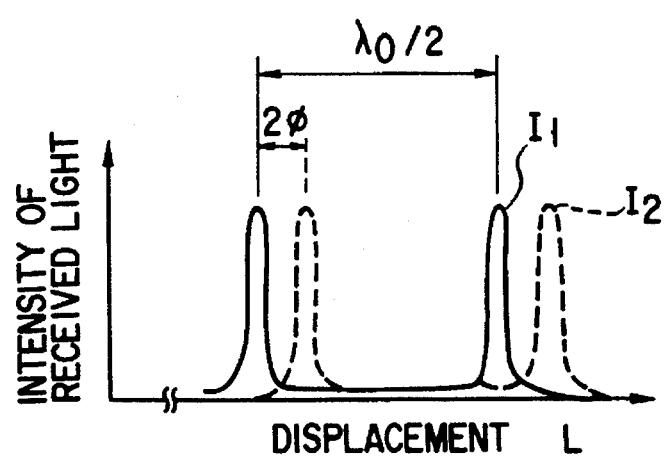
FIG. 11B is a diagram showing the relationship between a displacement of the photodetector as an external mirror and a light receiving intensity.

Next, an optical displacement sensor according to the seventh embodiment of the present invention will be described with reference to FIGS. 11A and 11B.

In the description of this embodiment, the same elements as those in the above embodiments are designated by the same reference numerals, and the explanation of these elements will be omitted.

This embodiment is an example to which the sixth embodiment is applied. In this embodiment, a photodetector 95 made of a semiconductor substrate is employed as an external mirror, and two pairs of the photodetector 95 and the vertical-cavity surface-emitting laser 37 are set up, to one of which pairs the phase shift method is applied. With this structure, the direction of the displacement can be judged.

In the case where the external mirror 93 moves in a constant direction, the peak values of the light intensity signal detected by a light receiving region E of each photodetector 95 appear alternately. However when the moving direction of the external mirror 93 is reversed, the displacement amount including the direction of the photodetectors 95 can be measured by reversing the sign (positive/negative) of the counter numeral value of the counting device 69 (FIGS. 4A to 4C).

Next, an optical displacement sensor according to the eighth embodiment of the present invention will be described with reference to FIGS. 12A, 12B and FIGS. 13 to 16.

In the description of this embodiment, the same elements as those in the above embodiments are designated by the same reference numerals, and the explanation of these elements will be omitted.

This embodiment employs an vertical-cavity surface-emitting laser 101 in which photodetectors are integrated, and a pair of elastic members 117 are disposed between the surface-emitting laser 101 and the external mirror 43, thereby constituting a pressure sensor as a whole.

More specifically, the vertical-cavity surface emitting laser 101 has a sandwich structure in which a lower distribution Bragg reflector 77 made of a semiconductor multilayer film, an N-type semiconductor cladding layer 79, an active layer 81, a P-type semiconductor cladding layer 83 and an upper distribution Bragg reflector 85 made of a P-type semiconductor multilayer film are laminated on an N-type semiconductor substrate 73, and such a lamination is interposed between a P-type electrode 89 and an N-type electrode 91.

The pair of elastic members 117 are provided on the P-type electrode 89, and serves to support the external mirror 43 on the surface-emitting laser 101.

Since the displacement amount of the external mirror 43 and the pressure applied thereto has a proportional relationship in the linear elastic region, the pressure can be calculated by measuring the displacement amount of the external mirror 43.

When the thickness of the pair of elastic members 117 varies by $\Delta t$, the following relationship can be established:

$$F/2W_G L_G = E\Delta t/t_0$$

where F(N) represents an external force applied between the external mirror 43 and the surface-emitting laser 101, $W_G$ (m) presents a contact width of the elastic members 117 with respect to the surface-emitting laser 101, $L_G$ represents a contact length, and $t_0$ represents a thickness.

Further, E (N/m$^2$) represents the Young's modulus of the elastic members 117.

According to such a relationship, for example, when $W_G=100$ μm, $L_G=200$ μm, and $t_0=100$ μm, and a rubber (E to $3\times10^6$ N/m$^2$) is used for the elastic members 117, since the minimum resolution of the displacement is $\lambda_0/2$ to 0.49 μm, it is estimated that the resolution $\Delta F$min of the external force F, is $5.9\times10^{-4}$ (N)=0.060 gf.

The range of the resolution of the external force can be expanded widely by selecting such an appropriate material for the elastic members 117 as to achieve a desired elastic constant.

Next, a method of manufacturing the above-described pressure sensor (see FIG. 12A) will be described with reference to FIGS. 13 to 16.

Figure 13:
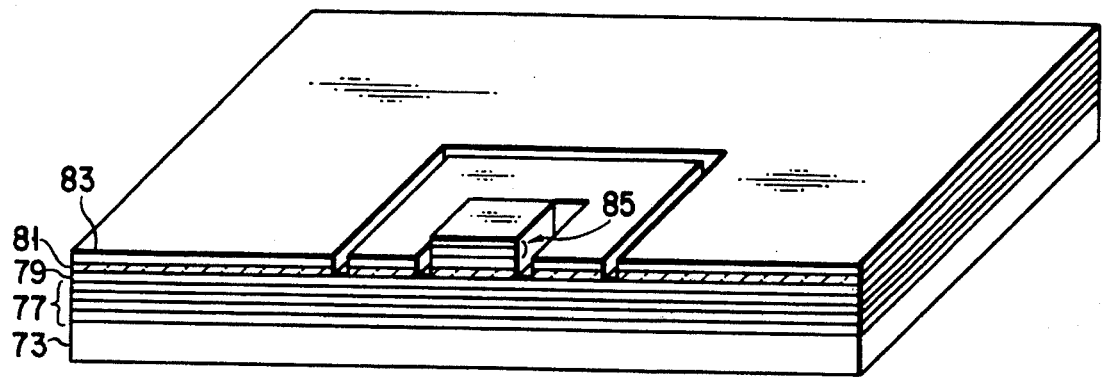
FIG. 13 is a diagram showing a step of manufacturing the sensor shown in FIG. 12A.

First, as can be seen in FIG. 13, a lower distribution Bragg reflector 77 made of a semiconductor multilayer film, an N-type semiconductor cladding layer 79, an active layer 81, a P-type semiconductor cladding layer 83 and an upper distribution Bragg reflector 85 made of a P-type semiconductor multilayer film are laminated on an N-type semiconductor substrate 73 by the organometal vapor phase epitaxial method or the like.

Next, in order to electrically separate the surface-emitting laser region T from light detecting regions E formed on both side of the region T, a groove which reaches the border line between the active layer 81 and the N-type semiconductor cladding layer 79 is formed by photoetching.

Thereafter, the upper distribution Bragg reflector 85 remaining in the upper section of the light detecting regions E is removed by etching.

Figure 14:
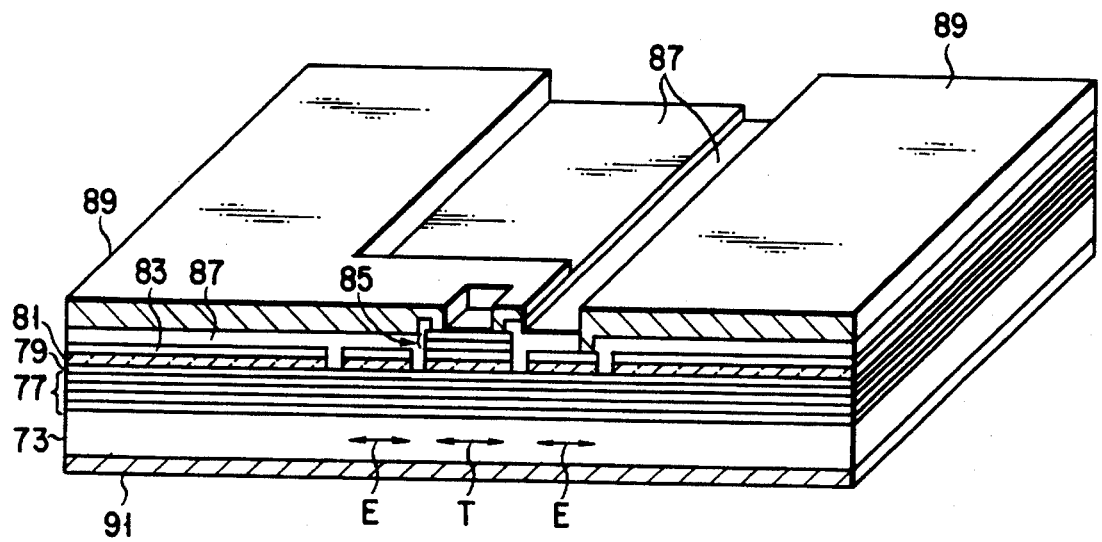
FIG. 14 is a diagram showing a step of manufacturing the sensor shown in FIG. 12A.

As can be seen in FIG. 14, a silicon dioxide film 87 is deposited by a spatter method or the like, for protection of the surface, and then windows are opened for an upper end surface of the surface-emitting laser region T and contact regions of the light detecting regions E by photoetching.

After the P-type electrode 89 is patterned by a lift-off method or the like, into an upper electrode for the surface laser region T and the light detecting regions E, the rear surface of the N-type semiconductor substrate 73 is polished, and an N-type electrode 91 is deposited thereon, which is further subjected to a thermal treatment.

Subsequently, as shown in FIG. 15, a pair of elastic members 117 are formed. For example, in the case where a material such as polyimide is employed, such a pattern of a pair of elastic members 117 that a cavity 119 is formed above the laser beam resonating region T and the light detecting regions E, is formed by spin coating and a photoetching method.

As shown in FIG. 16, an external mirror 43 made by depositing gold on a silicon substrate or the like, is adhered to the upper section of each of the pair of elastic members 117. For adhesion, a UV hardening resin or the like can be used. Further, the cutting of the chip, die bonding, wire bonding and the like are carried out to complete a pressure sensor such as shown in FIG. 12A.

Next, an optical displacement sensor according to the ninth embodiment of the present invention will be described with reference to FIGS. 17A and 17B.

In the description of this embodiment, the same elements as those in the above embodiments are designated by the same reference numerals, and the explanation of these elements will be omitted.

As shown in FIG. 17A, this embodiment employs a vertical-cavity surface-emitting laser 101 in which photodetectors are integrated, and the surface-emitting laser 101 is fixed on a heat sink 33 partitioned, for example, by a pill-shaped or cubic casing 35 arranged around the laser 101.

Further, on the heat sink 33 partitioned by the casing 35, an elastic member 117 is formed such as to surround the surface-emitting laser 101. An external mirror 43 is placed on this elastic member 17.

A piston 121 is inserted into the casing 35 so as to abut on the external mirror 43, and the external mirror 43 is interposed between the elastic member 117 and the piston 121.

It is preferable that the inside of the elastic member 117 is filled with an inert gas such as $N_2$ or He.

The piston 121 is machined at an extremely high accuracy so as to be movable in a certain direction with respect to the casing 35.

With such a structure, the inclination of the external mirror 43 is limited by the piston 121, the machine accuracy of the casing 35 and the width (thickness) of the piston 121 even if an external force is applied to the piston 121, and therefore the external mirror 43 can be maintained in parallel with the surface-emitting laser 101.

FIG. 17B shows a remodeled version in which a pressure sensor having the above-described structure in a casing 35 which has a bottom.

Next, an optical displacement sensor according to the tenth embodiment of the present invention will be described with reference to FIGS. 18A to 18C.

In the description of this embodiment, the same elements as those in the above embodiments are designated by the same reference numerals, and the explanation of these elements will be omitted.

As shown in FIG. 18A, this embodiment employs a vertical-cavity surface-emitting laser 101 in which photodetectors are integrated, and the surface-emitting laser 101 is fixed on a heat sink 33.

Further, a ferroelectric layer 123 is provided between the external mirror 43 and the surface-emitting laser 101, and a laser beam emitted from the surface-emitting laser 101 resonates between the laser 101 and the external mirror 43 via the ferroelectric layer 123.

The ferroelectric layer 123 is capable of varying its refractive index in accordance with an external force, and for example, liquid crystal, ferroelectric liquid crystal, ferroelectric material and the like can be used.

With the above-described structure, a compact pressure sensor can be formed without using, for example, an elastic material 117, a piston 121 or the like (see FIGS. 17A and 17B).

In particular, with PLZT, which is transparent within a visible light region and is stable, a reliable sensor can be manufactured.

FIG. 18B shows a remodeled version of a pressure sensor, in which a transparent conductive film 125 is provided between the external mirror 43 and the ferroelectric 123, and a lead electrode 127 is connected to the transparent conductive film 125 and the ferroelectric layer 123.

With the above-described structure, the variation rate of the refractive index of the ferroelectric layer 123, that is, the sensitivity to the pressure, can be varied by applying a predetermined voltage to the ferroelectric layer 123 via the lead electrode 127.

Therefore, the offset control, the reset control to resume the initial state, or the sensitivity control can be performed by the lead electrode 127.

It should be noted that the order of the external mirror 43 and the transparent conductive film 125 can be reversed, or the external mirror 43 and the transparent conductive film 125 can be made of the same material.

Next, an optical displacement sensor according to the eleventh embodiment of the present invention will be described with reference to FIG. 19.

In the description of this embodiment, the same elements as those in the above embodiments are designated by the same reference numerals, and the explanation of these elements will be omitted.

As shown in FIG. 19, this embodiment employs a vertical-cavity surface-emitting laser 101 in which photodetectors are integrated, and the surface-emitting laser 101 is fixed on a heat sink 33.

An elasticity variable material is formed on the heat sink 33 so as to surround the surface-emitting laser 101, and an external mirror 43 is provided on the elasticity variable material 129 via a transparent conductive film 125.

The elasticity variable material 129 is formed to be capable of varying its elastic modulus to a desired value with a voltage applied through the lead electrode 127, and can be made of the liquid crystal, ferroelectric liquid crystal, ferroelectric material, or the like.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. An optical displacement sensor comprising:

a vertical-cavity surface-emitting laser for emitting a predetermined laser beam;

external reflection means combined with said vertical-cavity surface-emitting laser to form a compound cavity; and detection means capable of detecting a change in relative displacement between said vertical-cavity surface-emitting laser and a reflection surface of said external reflection means, by measuring a periodic variation in a laser output created due to a change in relative displacement between said vertical-cavity surface-emitting laser and said external reflection means, or a periodic variation in mirror loss of said compound cavity;

wherein said external reflection means includes:
at least two reflection regions within a beam-irradiated area of said vertical-cavity surface-emitting laser, and is combined with said vertical-cavity surface-emitting laser to form at least two sets of compound cavities, and
optical phase shifting means, provided in at least one of said two sets of compound cavities, for shifting a phase of a beam resonated in said at least one compound cavity, with respect to a beam resonated in another compound cavity.

2. An optical displacement sensor according to claim 1, wherein said optical phase shifting means is provided so as to cover an entire beam-irradiated area of said vertical-cavity surface-emitting laser, reflection regions of which have phase shift amounts different from each other.

3. An optical displacement sensor according to claim 1, wherein said optical phase shifting means is made of a dielectric film provided at a position corresponding to at least one reflection region, of said at least two reflection regions of said beam-irradiated area of said vertical-cavity surface-emitting laser.

4. An optical displacement sensor according to claim 1, wherein said dielectric film is provided so as to cover an entire beam-irradiated area of said vertical-cavity surface-emitting laser, reflection regions of which have thicknesses different from each other.

5. An optical displacement sensor according to claim 1, wherein said optical phase shifting means is a reflection surface groove formed in a reflection surface of said external reflection means, corresponding to at least one reflection region, of said at least two reflection regions of said beam-irradiated area of said vertical-cavity surface-emitting laser.

6. An optical displacement sensor comprising:
at least two vertical-cavity surface-emitting lasers, provided on a same substrate, for emitting a predetermined laser beam;
external reflection means including a reflection region in each of beam irradiated areas of said vertical-cavity surface-emitting lasers, and combined with said vertical-cavity surface-emitting lasers to form at least two sets of compound cavities;
optical phase shifting means, provided in at least one of said compound cavities, for shifting a phase of the beam resonated in said at least one of said compound cavities;
at least two detection means for detecting a change in relative displacement between a vertical-cavity surface-emitting laser and a reflection surface of said external reflection means for each compound cavity, by measuring a periodic variation in a laser output of each of said two or more vertical-cavity surface-emitting lasers, or a periodic variation in mirror loss of each of said two or more compound cavities, created due to a change in relative displacement between each vertical-cavity surface-emitting laser and said external reflection means.

7. An optical displacement sensor according to claim 6, wherein said optical phase shifting means is provided so as to cover an entire beam-irradiated area of said vertical-cavity surface-emitting laser, reflection regions of which have phase shift amounts different from each other.

8. An optical displacement sensor according to claim 6, wherein said optical phase shifting means is made of a dielectric film provided at a position corresponding to at least one reflection region, of said at least two reflection regions of said beam-irradiated area of said vertical-cavity surface-emitting laser.

9. An optical displacement sensor according to claim 6, wherein said dielectric film is provided so as to cover an entire beam-irradiated area of said vertical-cavity surface-emitting laser, reflection regions of which have thicknesses different from each other.

10. An optical displacement sensor according to claim 6, wherein said optical phase shifting means is a reflection surface groove formed in a reflection surface of said external reflection means, corresponding to at least one reflection region, of said at least two reflection regions of said beam-irradiated area of said vertical-cavity surface-emitting laser.

11. An optical displacement sensor comprising:
a vertical-cavity surface-emitting laser having a structure wherein at least an upper mirror, an active layer and a lower mirror are stacked on a semiconductor substrate;
external reflection means combined with said vertical-cavity surface-emitting laser to form a compound cavity; and
detection means capable of detecting a change in relative displacement between said vertical-cavity surface-emitting laser and a reflection surface of said external reflection means, by measuring a periodic variation in a laser output created due to a change in relative displacement between said vertical-cavity surface-emitting laser and said external reflection means, or a periodic variation in mirror loss of said compound cavity;
wherein said vertical-cavity surface-emitting laser and said external reflection means are arranged so as to satisfy the following conditions;

$$[0.8 \ \mu m < W_{eff} < 30 \ \mu m] W_{b,SEL} < 30 \ \mu m$$

and $$5\lambda < L \leq 10^5 \lambda$$

where $W_{b,SEL}$ represents a diameter of an emitting window of said vertical-cavity surface-emitting laser, $\lambda$ represents an oscillation wavelength of said vertical-cavity surface-emitting laser, and L represents a distance between an emitting surface of said vertical-cavity surface-emitting laser, opposed to said external reflection means, and a reflection surface of said external reflection means.

12. An optical displacement sensor comprising:
a vertical-cavity surface-emitting laser having a structure wherein at least an upper mirror, an active layer and a lower mirror are stacked on a semiconductor substrate;
external reflection means combined with said vertical-cavity surface-emitting laser to form a compound cavity; and
detection means capable of detecting a change in relative displacement between said vertical-cavity surface-emitting laser and a reflection surface of said external reflection means, by measuring a periodic variation in a laser output created due to a change in relative displacement between said vertical-cavity surface-emitting laser and said external reflection means, or a periodic variation in mirror loss of said compound cavity;
wherein said vertical-cavity surface-emitting laser and said external reflection means are arranged so as to satisfy the following conditions:

$$[0.8 \ \mu m < W_{eff}] W_{b,SEL} < 30 \ \mu m \text{ and } leff < L$$

and $$\lambda < L \leq 10^5 \lambda$$

where leff represents a cavity length of said vertical-cavity surface-emitting laser, defined by a distance between a lower surface of said upper mirror and an upper surface of said vertical-cavity surface-emitting laser, $W_{b,SEL}$ represents a diameter of an emitting window of said vertical-cavity surface-emitting laser, $\lambda$ represents an oscillation wavelength of said vertical-cavity surface-emitting laser, and L represents a distance between an emitting surface of said vertical-cavity surface-emitting laser, opposed to said external reflection means, and a reflection surface of said external reflection means.

13. An optical displacement sensor according to claim 12, further comprising laser output characteristics controlling means for controlling a shape of a characteristic curve representing how the laser output changes with regard to a change in the distance L, by arranging a set of parameters arbitrarily determined for one of said vertical-cavity surface-emitting laser and said compound cavity.

14. An optical displacement sensor according to claim 13, wherein said laser output characteristics controlling means controls a shape of a characteristic curve representing a change in the laser output with regard to a change in $\Delta L$ by adjusting a diameter of an emitting window $W_b$ where $W_b$ represents the diameter of the emitting window of said vertical-cavity surface-emitting laser and $\Delta L$ represents a displacement between the emitting surface of said vertical-cavity surface-emitting laser, opposed to said external reflection means, and the reflection surface of said external reflection means.

15. An optical displacement sensor according to claim 13, wherein said laser output characteristics controlling means controls a shape of a characteristic curve representing a change in the laser output with regard to a change in $\Delta L$ by adjusting a driving current $I_C$, where $I_C$ represents a driving current of said vertical-cavity surface-emitting laser, and $\Delta L$ represents a displacement between the emitting surface of said vertical-cavity surface-emitting laser, opposed to said external reflection means, and the reflection surface of said external reflection means.

16. An optical displacement sensor according to claim 13, wherein said laser output characteristics controlling means controls a shape of a characteristic curve representing a change in the laser output with regard to a change in $\Delta L$ by adjusting the distance L, where $\Delta L$ represents a displacement between the emitting surface of said vertical-cavity surface-emitting laser opposed to said external reflection means and the reflection surface of said external reflection means.

17. An optical displacement sensor according to claim 13, wherein said laser output characteristics controlling means controls a shape of a characteristic curve representing a change in the laser output with regard to a change in $\Delta L$ by adjusting a reflectivity $R_{EX}$, where $R_{EX}$ represents the reflectivity of said external reflection means, and $\Delta L$ represents a displacement between the emitting surface of said vertical-cavity surface-emitting laser, opposed to said external reflection means, and the reflection surface of said external reflection means.

\* \* \* \* \*

UNITED STATES PATENT AND TRADEMARK OFFICE
CERTIFICATE OF CORRECTION

PATENT NO. : 5,619,318
DATED : April 8, 1997
INVENTOR(S) : YAMAMOTO et al.

It is certified that error appears in the above-indentified patent and that said Letters Patent is hereby corrected as shown below:

```
Column 9, line 13, change "≠" to --≒--
         line 14, change "≠" to --≒-- (three occurrences)
         line 21, change "≠" to --≒--
         line 35, change "≠" to --≒-- (both occurrences)

Column 20, line 32, delete "[0.8µm<Weff<30µm]"
          line 68, delete "[0.8µm<Weff]"
```

Signed and Sealed this

Ninth Day of September, 1997

Attest:

BRUCE LEHMAN

*Attesting Officer*        *Commissioner of Patents and Trademarks*